(12) United States Patent
Kawai

(10) Patent No.: US 7,753,603 B2
(45) Date of Patent: Jul. 13, 2010

(54) DIGITAL CAMERA SYSTEM AND INTERMEDIATE ADAPTER

(75) Inventor: Sumio Kawai, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 1004 days.

(21) Appl. No.: 11/497,190

(22) Filed: Aug. 1, 2006

(65) Prior Publication Data

US 2007/0047953 A1 Mar. 1, 2007

(30) Foreign Application Priority Data

Aug. 26, 2005 (JP) ............................. 2005-246606

(51) Int. Cl.
*G03B 17/00* (2006.01)
(52) U.S. Cl. .................................... 396/530
(58) Field of Classification Search ................ 396/530, 396/544; 348/360
See application file for complete search history.

(56) References Cited

U.S. PATENT DOCUMENTS

| 4,518,239 | A | * | 5/1985 | Tomori ......................... 396/71 |
| 5,602,682 | A | * | 2/1997 | Ito et al. ....................... 359/737 |
| 6,126,334 | A | * | 10/2000 | Ohmori ........................ 396/354 |
| 6,157,781 | A | * | 12/2000 | Konno et al. .................. 396/71 |
| 6,449,013 | B1 | | 9/2002 | Suzuki |
| 2004/0227845 | A1 | * | 11/2004 | Kawai ......................... 348/360 |
| 2005/0174467 | A1 | | 8/2005 | Kawai |

FOREIGN PATENT DOCUMENTS

| JP | 63-239429 | 10/1988 |
| JP | 07-092525 | 4/1995 |
| JP | 2000-244821 | 9/2000 |
| JP | 2004-112661 | 4/2004 |
| JP | 2005-070711 | 3/2005 |

OTHER PUBLICATIONS

Chinese Office Action for Chinese Patent Application No. 2006101265734, mailed on May 9, 2008 (7 pgs.) (with English Translation (4 pgs.)).

* cited by examiner

*Primary Examiner*—W. B. Perkey
*Assistant Examiner*—Noam Reisner
(74) *Attorney, Agent, or Firm*—Straub & Pokotylo; John C. Pokotylo

(57) ABSTRACT

In a digital camera system, a lens barrel adapted to a first camera body can be attached to a second camera body having a flange focal length which is shorter than that of the first camera body via an intermediate adapter, and the intermediate adapter is interposed to thereby set the flange focal length to be equal. Moreover, a compensating optical device is incorporated in the intermediate adapter to thereby match an optical distance from a mount surface to an image capture surface of the first camera body with an optical distance from a mount surface of the intermediate adapter to an image capture surface of the second camera body in a state in which the intermediate adapter is attached.

9 Claims, 12 Drawing Sheets

DIGITAL CAMERA SYSTEM AND INTERMEDIATE ADAPTER

CROSS-REFERENCE TO RELATED APPLICATION

This application is based upon and claims the benefit of priority from prior Japanese Patent Application No. 2005-246606, filed on Aug. 26, 2005, the entire contents of which are incorporated herein by reference.

BACKGROUND OF THE INVENTION

1. Field of the Invention

The present invention relates to a digital camera system in which lenses are interchangeable, and an intermediate adapter for use in the digital camera system.

2. Description of the Related Art

Heretofore, in a camera system in which lenses are interchangeable, a distance (flange focal length) from a mount surface of the interchangeable lens to an image plane is defined, and the interchangeable lens attachable to the camera is designed based on the defined flange focal length. Therefore, in a case where the interchangeable lens designed so as to be applied to a camera having a long flange focal length is attached to another camera having a short flange focal length, the flange focal length needs to be adjusted using an intermediate adapter or the like. As to this type of intermediate adapter, a large number of proposals are described in Japanese Patent Application Laid-Open No. 2005-70711.

In addition, in a conventional digital camera, an optical low-pass filter (hereinafter referred to as the optical LPF) made of crystals or the like having birefringent characteristics is disposed on the front of an image sensor in order to reduce false color and the like derived from the high-frequency components of a photographed image. This optical LPF splits an incident luminous flux into normal light which is not double refracted and abnormal light (birefringent light), and the split birefringent light is struck on pixels disposed adjacent to each other in the image sensor. Therefore, to prevent generation of Moire fringes, a thickness of the optical LPF has to be appropriately set in accordance with a pixel pitch.

Moreover, between a photographing lens and the image sensor, in addition to the optical LPF, flat-plate optical elements are installed such as a dustproof filter, infrared ray absorbing glass and protective glass for storing the image sensor in a sealed state. These optical elements have peculiar optical characteristics (e.g., a refractive index, etc.), respectively. Therefore, in the digital camera in which the lenses are interchangeable, unless the interchangeable lens is designed in consideration of not only a mechanical distance (flange focal length) from the mount surface of the interchangeable lens to the image plane but also a change of an optical distance (optical path length) attributable to the plurality of optical elements, a generally high image quality of the digital camera system cannot be obtained. This also applies to the above intermediate adapter.

However, in a conventional adapter for adjusting the flange focal length as described in Japanese Patent Application Laid-Open No. 2005-70711, only adjustment of the flange focal length is noted. In Japanese Patent Application Laid-Open No. 2005-70711, there is not any idea that the optical path length is adapted.

BRIEF SUMMARY OF THE INVENTION

A digital camera system of the present invention has a first camera body, an interchangeable lens designed for a second camera body which is different from the first camera body, and an intermediate ring attachable to both of the camera body and the interchangeable lens, and the intermediate ring includes a compensating optical device.

The intermediate ring can compensate for a difference in flange focal length between the first camera body and the second camera body, and owing to the compensating optical device, an optical aberration can be minimized.

One example of a constitution of the digital camera system of the present invention will hereinafter be described. The system comprises: a first camera body including a first image sensor and having a first flange focal length; a first lens adapted to the first camera body; a first optical device constituted of a plurality of optical elements arranged between the first lens and the first image sensor; a second camera body including a second image sensor and having a second flange focal length which is shorter than the first flange focal length; a second lens adapted to the second camera body; a second optical device constituted of a plurality of optical elements arranged between the second lens and the second image sensor; and an intermediate adapter having a lens detachable portion for detachably attaching the first lens on one end of the intermediate adapter and having a lens detachable portion for detachably attaching the second camera body on the other end thereof, wherein the intermediate adapter includes a third optical device; a first optical equivalent amount $\Sigma\{ti \times (1-ni)/ni\}$ of the first optical element is larger than a second optical equivalent amount $\Sigma\{tj \times (1-nj)/nj\}$ of the second optical equivalent amount, in which i and j each is an integer of 1, 2, . . . given to each optical element of the first and second optical devices from a lens side, ni is a refractive index of each optical element of the first optical device, ti is a thickness thereof, nj is a refractive index of each optical element of the second optical device, and tj is a thickness thereof; and a sum $\Sigma\{tk \times (1-nk)/nk\} + \Sigma\{tj \times (1-nj)/nj\}$ of a third optical equivalent amount $\Sigma\{tk \times (1-nk)/nk\}$ and the second optical equivalent amount $\Sigma\{tj \times (1-nj)/nj\}$ is substantially equal to the first optical equivalent amount $\Sigma\{ti \times (1-ni)/ni\}$, in which k is an integer of 1, 2, . . . given to each optical element of the third optical device from a lens side, nk is a refractive index of each optical element of the third optical device, and tk is a thickness thereof.

The present invention can also be understood as the invention of an intermediate ring.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

A preferred embodiment of the invention is described below with reference to the accompanying drawings.

Prior to description of the embodiment of the present invention, there will be described a way to determine a thickness of an optical LPF in accordance with a pixel pitch of an image sensor and a material (optical characteristic) of the optical LPF in a digital camera system in which lenses are interchangeable.

There are several types of single lens reflex digital cameras in which the lenses (i.e., lens barrels.) are interchangeable with respect to camera bodies, and the number of pixels of image sensors differ from one another. That is, the image sensors having different pixel pitches are incorporated, and the interchangeable lenses having the same specifications are attachable to the types of cameras, respectively.

In the camera body of the single lens reflex digital camera, as described above, on the front of the image sensor having the different pixel pitch, the optical LPF is disposed which has a thickness in accordance with the pixel pitch.

A reason why the thickness of the optical LPF is set in accordance with the pixel pitch of the image sensor as described above is that a luminous flux transmitted through the optical LPF is split into normal light which is not double refracted and abnormal light (birefringent light). On the other hand, to prevent the generation of the Moire fringes, the split luminous fluxes have to be struck on the adjacent pixels of the image sensor. Therefore, the thickness of the optical LPF needs to be determined in accordance with the pixel pitch.

Figure 11:
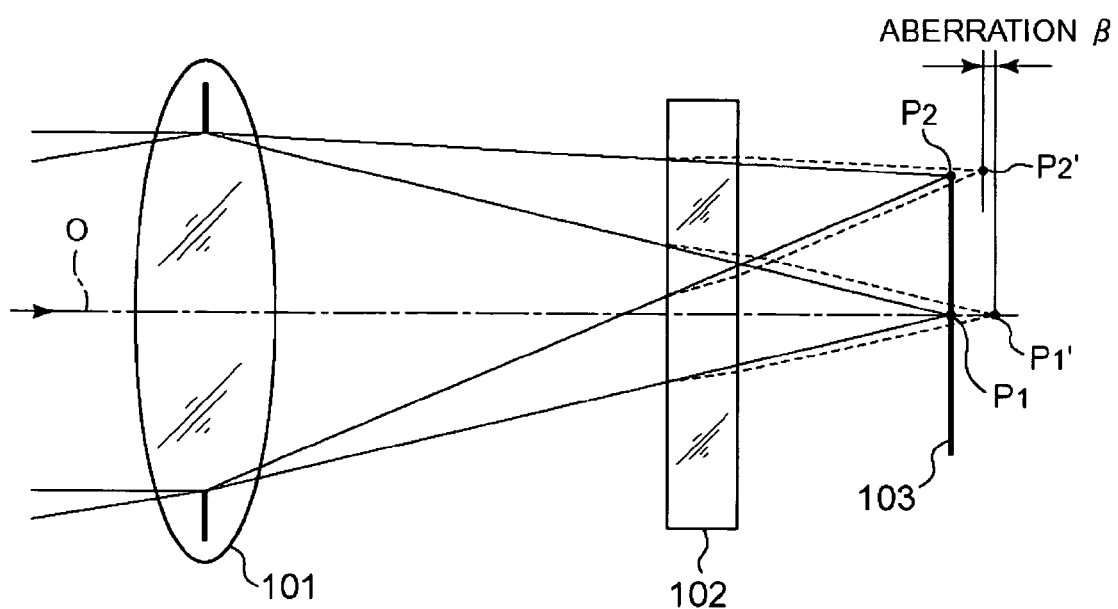
FIG. 11 is an optical path diagram showing a state of a change of an image forming position due to the presence of an optical filter disposed on the front of the image sensor in an image capture optical system.

In addition, when the optical LPF having the different thickness is disposed on the front of the image sensor, an image forming position of the image sensor changes. FIG. 11 is an optical path diagram showing a state of the change of the image forming position due to the presence of the optical LPF disposed on the front of the image sensor in an image capture optical system. Between the interchangeable lens and the image sensor, flat-plate optical elements are installed such as a dustproof filter, infrared ray absorbing glass and protective glass for storing the image sensor in a package in a sealed state. The image forming position similarly changes with the flat-plate optical elements.

In a case where an optical LPF 102 is not disposed in front of an image capture surface 103 of the image sensor as in FIG. 11, the center luminous flux transmitted through a lens 101 forms an image on a point P1 of the image capture surface 103. A peripheral luminous flux transmitted through the lens 101 forms an image on a point P2 of the image capture surface 103. However, in a case where the optical LPF 102 is disposed in front of the image capture surface 103 of the image sensor, the center luminous flux transmitted through the lens 101 forms an image on a point P1' behind the image capture surface 103.

In a photographing optical system of the digital camera, a difference in optical path length is usually made between the luminous flux reaching the center of a photographing screen (the image is formed on the point P1' of FIG. 11) and the luminous flux reaching a peripheral portion (the image is formed on a point P2' of FIG. 11), and a field curvature aberration is generated. To correct a difference β between the optical path lengths of the center and the peripheral portion of this photographing screen, in an optical device constituted of a specific optical element, a photographing optical system is provided with such an optical characteristic as to cancel an aberration such as field curvature aberration. In consequence, aberrations can be corrected such as the field curvature aberration, a spherical aberration and an astigmatism to form the image on the image sensor.

In a case where this way to consider the aberration correction is applied to the digital camera of the lens interchangeable type, however, the following problem occurs. That is, there is supposed a case where in the lens interchangeable type of digital camera system including a first camera body provided with a first optical device and an interchangeable lens designed so as to be adapted to this body, the interchangeable lens is attached to a second camera body provided with a second optical device. In this case, since refractive indexes and thicknesses of the optical elements constituting the first and second optical devices differ, and the specific optical element is not disposed, the optical path lengths of the camera bodies differ, and there is generated a problem that an optical aberration such as the field curvature aberration cannot be appropriately corrected. More specifically, in a case where the image sensors having the different pixel pitches are mounted on the first and second camera bodies, the thicknesses of the optical LPFs need to be set so as to be adapted to the pixel pitches, respectively. Therefore, the optical LPFs have different thicknesses, and the above problem occurs.

On the other hand, in the conventional lens interchangeable type of digital camera, as the optical LPF, instead of rock crystal, there is applied, for example, an LN (LiNbO_3, lithium niobate) device having a remarkably smaller thickness and a great birefringent property as compared with rock crystal. To change the number of the pixels, a size of the image sensor is changed so that the pixel pitch hardly changes. In a case where the LN device is applied, since the birefringent property of the device is great, the thickness of a LPF can be reduced. Therefore, the optical path length of the luminous flux hardly changes, and the interchangeable lens can be interchanged even between the bodies of the digital cameras having different pixel pitches.

Figure 12:
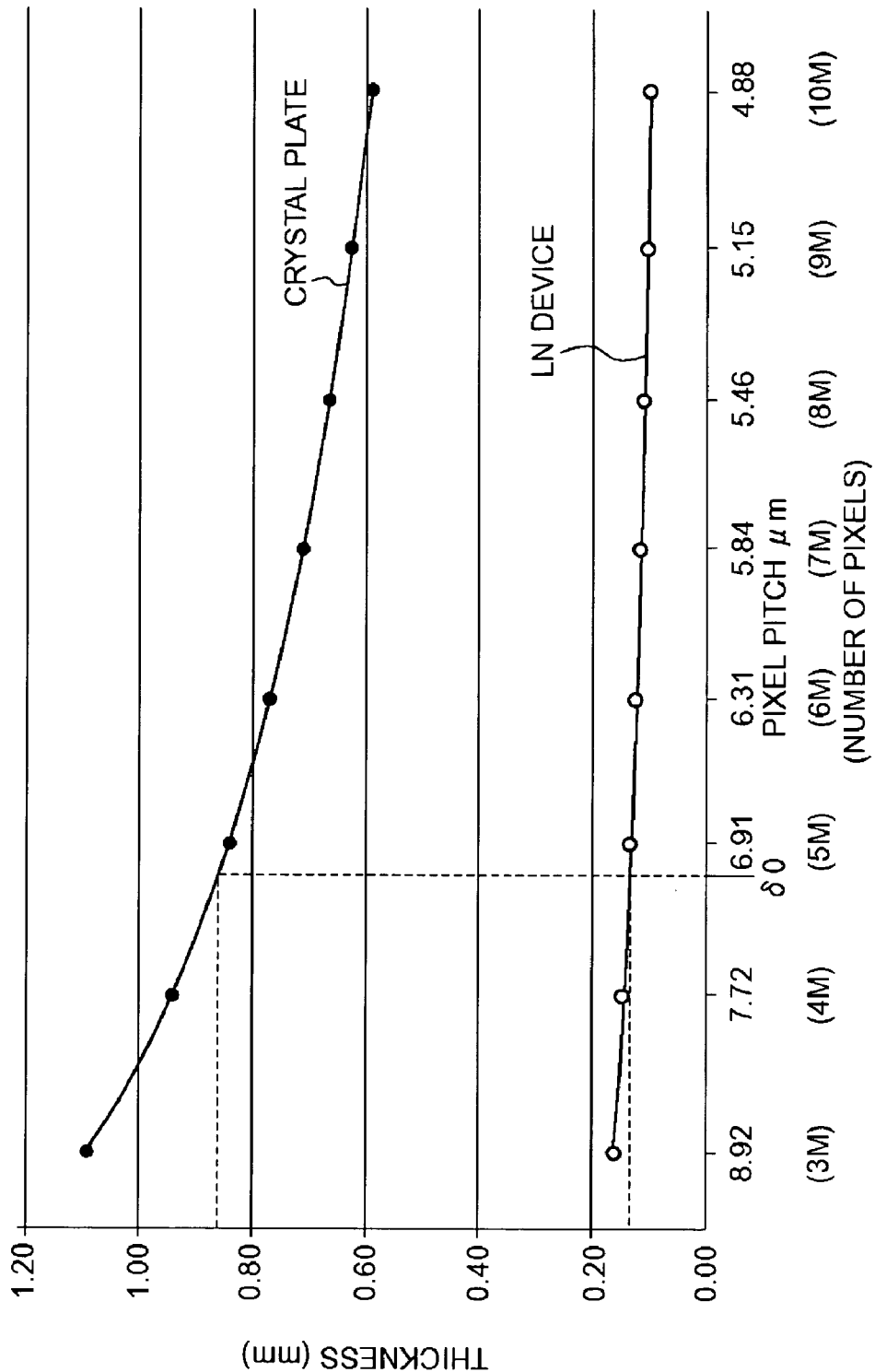
FIG. 12 is a graph showing a relation between a pixel pitch of the image sensor or the number of pixels of the image sensor and thicknesses of optical LPFs (rock crystal and LN device) adapted to the image sensor.

FIG. 12 is a graph showing a relation between the pixel pitch of an image sensor (or the number of the pixels of an image sensor) and the thicknesses of the optical LPFs (rock crystal and LN device) adapted to the image sensor. As shown in FIG. 12, when the pixel pitch P narrows, the thickness of the adapted optical LPF is reduced. The thickness of the LN device adapted to an equal pixel pitch P is about ⅕ to ⅙ of the thickness of rock crystal.

In consideration of the above contents, an embodiment of the present invention will be described hereinafter with reference to the drawings.

First, there will be described an outline of a constitution of a digital camera system in a first embodiment of the present invention with reference to FIGS. 1 to 3.

Figure 1A:
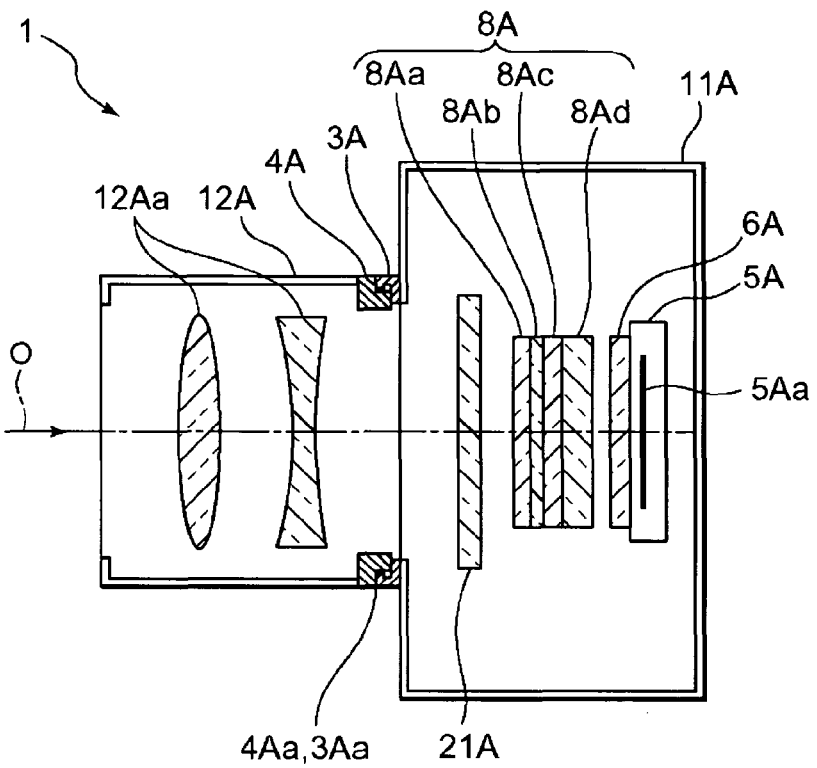
FIG. 1A is a diagram showing a combined state of a camera body and an interchangeable lens constituting a digital camera system in one embodiment of the present invention, and an arrangement of an optical member and an image sensor built in the system, and showing a combined state of a reference camera body (first camera body) and a first lens (first lens barrel)
Figure 1B:
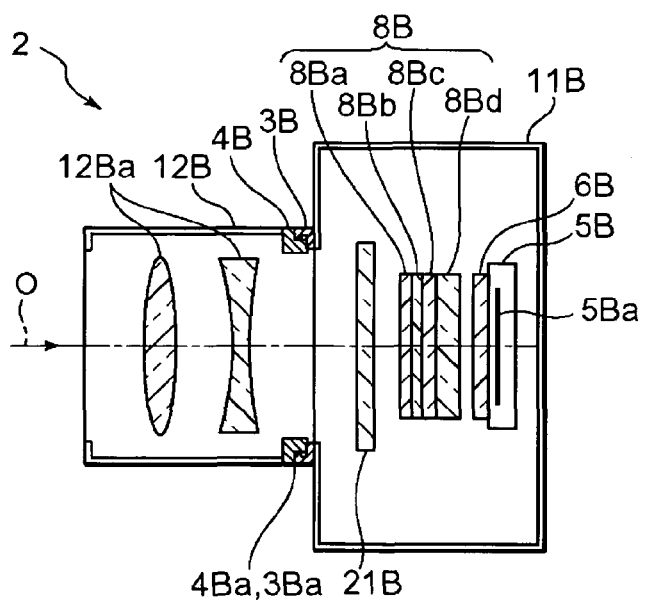
FIG. 1B is a diagram showing a combined state of a camera body and an interchangeable lens constituting a digital camera system in one embodiment of the present invention, and an arrangement of an optical member and an image sensor built in the system, and showing a combined state of a non-reference camera body (second camera body) and a second lens (second lens barrel)
Figure 2:
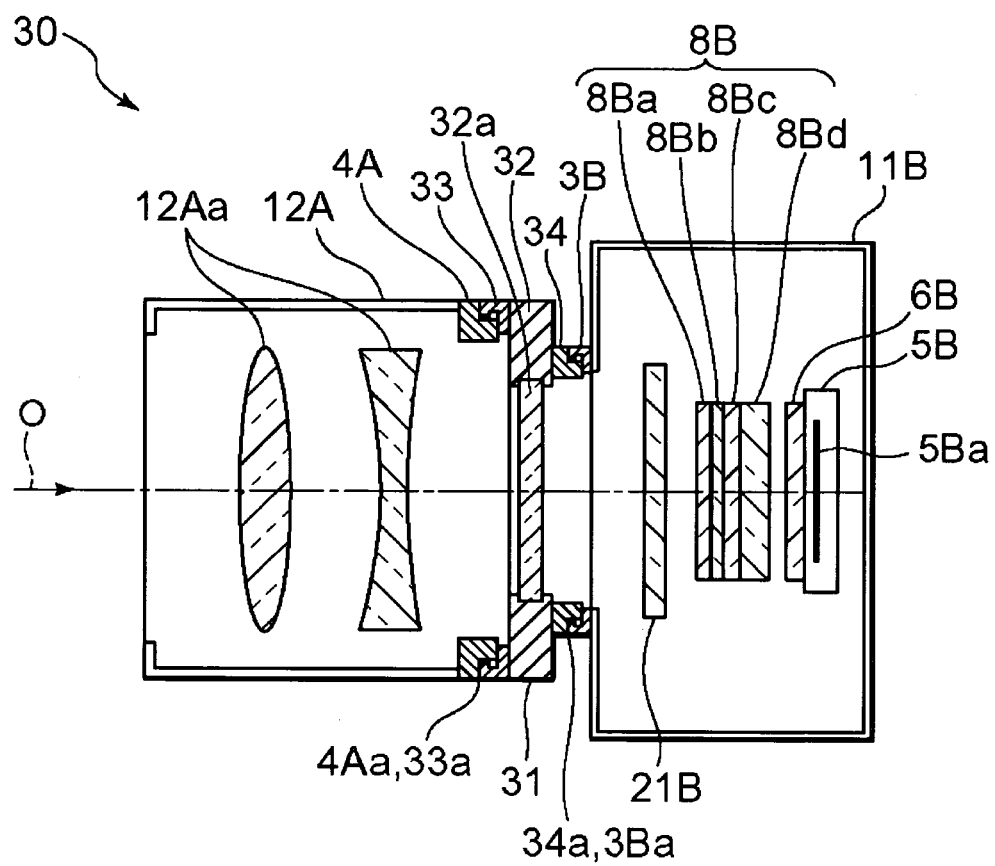
FIG. 2 is a sectional view of a state in which the first lens barrel is attached to the second camera body via an intermediate adapter in the digital camera system of FIGS. 1A and 1B.

FIGS. 1A, 1B and 2 are sectional views showing a combined state of a camera body and an interchangeable lens constituting the digital camera system of the first embodiment of the present invention, and an arrangement of an optical member and an image sensor built in the system. FIG. 1A shows a combined state of a reference camera body (first camera body) and a first lens, and FIG. 1B shows a combined state of a non-reference camera body (second camera body) and a second lens. FIG. 2 is a sectional view of a state in which the first lens is attached to the second camera body via an intermediate adapter.

Figure 3A:
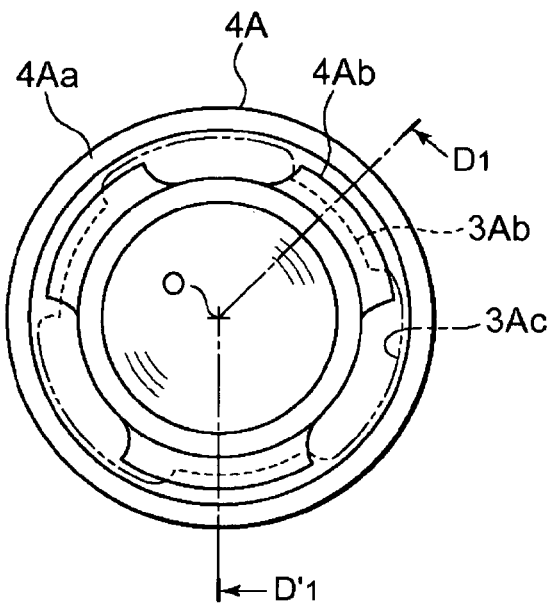
FIG. 3A shows a state of a mount portion of the first lens barrel viewed from a camera body side, and a mount portion (chain double-dashed line) of the camera body to be attached in the digital camera system of FIG. 1A.
Figure 3B:
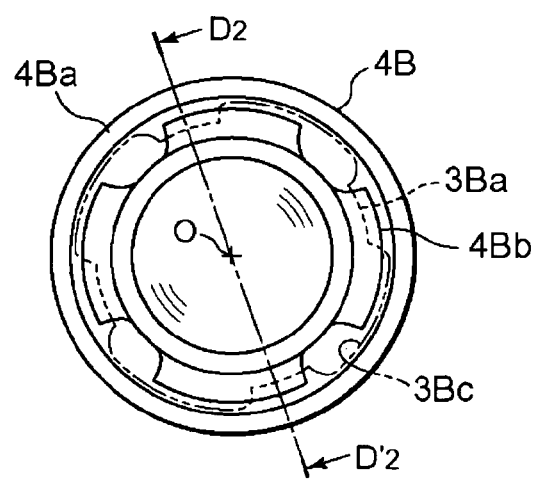
FIG. 3B shows a state of a mount portion of the second lens barrel viewed from the camera body side, and a mount portion (chain double-dashed line) of the camera body to be attached in the digital camera system of FIG. 1B.

FIGS. 3A, 3B show a state of a mount portion of the lens viewed from a camera body side, and a mount portion (chain double-dashed line) of the camera body to be attached in the digital camera system of the present embodiment. FIG. 3A shows the mount portion of the first lens, and FIG. 3B shows the-mount portion of the second lens.

The digital camera system of the present embodiment includes a digital camera 1 and a digital camera 2 shown in FIGS. 1A, 1B and a digital camera 30 shown in FIG. 2 as described above.

The digital camera 1 has a first camera body 11A which is the reference camera body, and an interchangeable lens barrel (hereinafter referred to as the lens barrel) 12A as the first lens detachably attached to the camera body 11A.

The digital camera 2 has a second camera body 11B and an interchangeable lens barrel (hereinafter referred to as the lens barrel) 12B, the second camera body is a non-reference camera body having a physical distance from a mount surface to an image capture surface of the image sensor, that is, a flange focal length which is shorter than that of the first camera body 11A, and the lens barrel is a second lens detachably attached to the camera body 11B and having a short back focal length.

The digital camera 30 has the second camera body 11B and the lens barrel 12A attached to the camera body 11B via an intermediate adapter 31.

As shown in FIG. 3A, a body-side mount portion 3A of the first camera body 11A is provided with three body-side mount pawls 3Ab and three cutout portions 3Ac. A lens-side mount portion 4A of the lens barrel 12A is provided with three lens-side mount pawls 4Ab.

In a case where the lens barrel 12A is attached to the first camera body 11A, an operator inserts the lens-side mount pawls 4Ab into the cutout portions 3Ac (shown by the chain double-dashed line in FIG. 3A) of the body-side mount portion 3A of the first camera body in an optical axis O direction. Thereafter, the lens barrel 12A is rotated around the optical axis O of the first camera body 11A to engage the lens-side mount pawls 4Ab with the body-side mount pawls 3Ab (shown by a dotted line in the drawing), thereby obtaining an attached state. In this lens barrel attached state, a mount surface 3Aa which is a lens attaching surface of the front of the mount portion 3A of the first camera body 11A abuts on a mount surface 4Aa of the mount portion 3A of the lens barrel 12A, and both of the surfaces are brought into close contact with each other to define relative positions of the surfaces in the optical axis direction. It is to be noted that a first flange focal length of the first camera body 11A is a distance between the mount surface 3Aa and a photoelectric conversion surface (image capture surface) 5Aa of an image sensor 5A.

As shown in FIG. 3B, a mount portion 3B of the second camera body 11B is provided with four body-side mount pawls 3Bb and four cutout portions 3Bc. A lens-side mount portion 4B of the lens barrel 12B is provided with four lens-side mount pawls 4Bb. Moreover, a mount diameter of the second camera body 11B is smaller than that of the first camera body 11A.

In a case where the lens barrel 12B is attached to the second camera body 11B, the operator inserts the lens-side mount pawls 4Bb into the cutout portions 3Bc (shown by the chain double-dashed line in FIG. 3B) of the body-side mount portion 3B of the second camera body in the optical axis O direction. Thereafter, the lens barrel 12B is rotated around the optical axis O of the second camera body 11B to engage the lens-side mount pawls 4Bb with the body-side mount pawls 3Bb (shown by a dotted line in the drawing).

In the above lens barrel attached state, a mount surface 3Ba which is a lens attaching surface of the front of the mount portion 3B of the second camera body 11B abuts on a mount surface 4Ba of the mount portion 3B of the lens barrel 12B, and both of the surfaces are brought into close contact with each other to define relative positions of the surfaces in the optical axis direction. It is to be noted that a second flange focal length of the second camera body 11B is a distance between the mount surface 3Ba and a photoelectric conversion surface (image capture surface) 5Ba of an image sensor 5B, and shorter than the first flange focal length of the first camera body 11A.

As described above, the lens barrel 12A is different from the lens barrel 12B in mount diameter. Moreover, since the number of engagement pawls also differs, the lens barrel 12A cannot be directly attached to the second camera body 11B, and the lens barrel 12B cannot be attached to the first camera body 11A.

In the first camera body 11A to which the lens barrel 12A is detachably attached, as shown in FIG. 1A, there are built: the image sensor 5A as a first image sensor constituted of a CCD (or a CMOS type image sensor) or the like having a protective glass 6A; an optical LPF 8A as a first optical low-pass filter including an infrared ray absorbing glass 8Ab disposed on the front of the image sensor; and a dustproof filter 21A which protects the image sensor and the optical LPF from dust. The first camera body 11A has the body-side mount portion 3A having the body-side mount surface 3Aa which can abut on the lens-side mount surface 4Aa as described above. It is to be noted that the dustproof filter 21A, the optical LPF 8A and the protective glass 6A built in the first camera body 11A constitute a first optical device.

The image sensor 5A is, for example, a 4/3 [four thirds®] type of image sensor having a predetermined reference pixel pitch $\delta 0$ which is a first pixel pitch (the corresponding reference pixel number is S0), and a subject image formed on the photoelectric conversion surface 5Aa which is an image forming surface of the image sensor 5A is converted into an electric image capture signal.

The optical LPF 8A has such a predetermined thickness as to split a ray in accordance with the reference pixel pitch $\delta 0$ of the image sensor 5A in order to prevent generation of the Moire fringes, is formed of crystal plates 8Aa, 8Ac and 8Ad having birefringent characteristics in a predetermined direction, and further includes the infrared ray absorbing glass 8Ab.

In a case where the reference pixel pitch $\delta 0=7$ μm is set, to form the optical LPF 8A for tetragonal four-point splitting (the incident ray is split into four points passing through corners of a square with side length of the pixel pitch), a thickness and a rotation angle of each crystal plate are set as follows. That is, the crystal plate 8Aa has a rotation angle=45° with a thickness t2=0.84 mm, the crystal plate 8Ac has a rotation angle=−45° with a thickness t4=0.84 mm, and the crystal plate 8Ad has a rotation angle=0° with a thickness t5=1.19 mm. At this time, refractive indexes of rock crystal are n2, 4 and 5=1.544. This optical LPF 8A has a total crystal plate thickness of 2.87 mm.

The infrared ray absorbing glass 8Ab is made of phosphate glass or fluoric phosphate glass, and a thickness t3=0.5 mm is set with a refractive index n3=1.542. There is not any restriction on a material or a thickness of the dustproof filter 21A, but here the filter is an optical glass having a refractive index n1=1.52 with a thickness t1=1 mm. Furthermore, the protective glass 6A is an optical glass having a refractive index n6=1.52 with a thickness t6=0.6 mm.

The optical LPF 8A is disposed between the body-side mount portion 3A and the image sensor 5A, and the filter is the thickest even as compared with the optical LPF 8B of the second camera body 11B described later, and other optical LPF applied to another non-reference camera body detachably attached to the same lens barrel 12A.

This lens barrel 12A contains a photographing optical system 12Aa constituted of a plurality of photographing lens units, and can directly be attached to the first camera body 11A as described above. Furthermore, the lens barrel 12A can detachably be attached to the second camera body 11B via the intermediate adapter 31 (FIG. 2) described later. This lens barrel 12A corresponds to one of a plurality of interchangeable lenses such as interchangeable lenses having different focal lengths, zoom lenses and macro lenses.

In a state in which the photographing optical system 12Aa of the lens barrel 12A is attached to the first camera body 11A, a taken subject luminous flux passes through the dustproof filter 21A and the optical LPF 8A to form an image on the photoelectric conversion surface 5Aa of the image sensor 5A. The photographing optical system 12Aa is designed and produced so as to form the image on the photoelectric conversion surface 5Aa without generating a field curvature aberration, a spherical aberration, an astigmatism or the like in a state in which an effective optical path length is changed in accordance with the refractive index and the thickness of the optical LPF 8A or the like. That is, the system is designed and produced so as to obtain a non-aberration state in which the image forming point P1' formed by the center luminous flux and the image forming point P2' by the peripheral luminous flux shown in FIG. 11 are both positioned on the photoelectric conversion surface 5Aa of the image sensor 5A.

On the other hand, in the second camera body 11B to which the lens barrel 12B is detachably attached, as shown in FIG. 1B, there are built: the image sensor 5B as a second image sensor constituted of a CCD (MOS type image sensor) or the like having a protective glass 6B; an optical LPF 8B as a second optical low-pass filter including an infrared ray absorbing glass 8Bb disposed on the front of the image sensor; and a dustproof filter 21B which protects the image sensor and the optical LPF from dust. The second camera body has the body-side mount portion 3B having the body-side mount surface 3Ba which can engage with the lens-side mount surface 4Ba as described above. It is to be noted that the dustproof filter 21B, the optical LPF 8B and the protective glass 6B built in the second camera body 11B constitute a second optical device.

The image sensor 5B is a 4/3 [four thirds®] type of image sensor in the same manner as in the region image sensor 5A, but has a pixel pitch $\delta 1$ as a second pixel pitch having a value which is smaller than that of the reference pixel pitch $\delta 0$. A subject image formed on the photoelectric conversion surface 5Ba which is an image forming surface of this image sensor 5B is converted into an electric image capture signal in the same manner as in the image sensor 5A.

The optical LPF 8B corresponds to the pixel pitch $\delta 1$ of the image sensor 5B. In a case where this optical LPF is formed of a crystal plate having the same constitution as that of the optical LPF 8A, a thickness becomes different from that of the optical LPF 8A.

In a case where, for example, a pixel pitch $\delta 1=5$ μm is set, to form the optical LPF 8B for tetragonal four-point splitting (in detail, the incident ray is split into four points passing through corners of a square having the pixel pitch as one side) in the same manner as in the optical LPF 8A, a thickness and a rotation angle of each crystal plate are set as follows. That is, a crystal plate 8Ba has a rotation angle of 45° with a thickness t2=0.60 mm, a crystal plate 8Bc has a rotation angle of −45° with a thickness t4=0.60 mm, and the crystal plate 8Bd has a rotation angle=0° with a thickness t5=0.85 mm. As compared with a case where the reference pixel pitch $\delta 0=7$ μm is set, the above optical LPF 8B has a total crystal plate thickness of 2.05 mm, and becomes thinner as much as 0.82 mm. The refractive indexes of rock crystal are n2, 4 and 5=1.544.

The infrared ray absorbing glass 8Bb is made of phosphate glass or fluoric phosphate glass, and a thickness t3=0.5 mm is set with a refractive index n3=1.542. There is not any restriction on a material or a thickness of the dustproof filter 21B, but here the filter is an optical glass having a refractive index n1=1.52 with a thickness t1=1 mm. Furthermore, the protective glass 6B is an optical glass having a refractive index n6=1.52 with a thickness t6=0.6 mm. These specifications of the optical elements are the same as those of the infrared ray absorbing glass 8Ab, the dustproof filter 21A and the protective glass 6A built in the first camera body 11A.

The digital camera 2 is designed and produced so as to form the image on the photoelectric conversion surface 5Ba without generating the field curvature aberration, the spherical aberration, the astigmatism or the like in a state in which the effective optical path length changes in accordance with the refractive index and the thickness of the optical LPF 8B or the like.

In the above state, since the crystal plates have the different thicknesses, the optical path length of the optical device disposed between the lens barrel 12B and the image sensor 5B is shorter than that of the optical device of the first camera body 11A.

Therefore, it is possible to reduce a thickness of the second camera body 11B in the optical axis direction. The closer to the image sensor the ray from the interchangeable lens is, the smaller the distance from the optical axis becomes. Therefore, an outer shape of the camera body can be reduced even in a direction crossing the optical axis at right angles.

On the other hand, the lens barrel 12B has the lens-side mount portion 4B provided with the lens-side mount surface 4Ba which can abut on the mount surface 3Ba on the side of the second camera body, and contains a photographing optical system 12Ba constituted of a plurality of photographing lens units. This lens barrel 12B has a short back focal length as compared with the lens barrel 12A. In other words, as compared with the maximum angle formed, with the optical axis O, by a chief ray which has struck at a diagonal angle of the image sensor 5A in the lens barrel 12A, the maximum angle is larger which is formed, with the optical axis O, by a chief ray struck at a diagonal angle of the image sensor 5B in the lens barrel 12B. The interchangeable lens itself also becomes short in the optical axis direction. The closer to a focal surface the ray is, the smaller the breadth becomes. Therefore, the diameter of the lens is reduced, and the interchangeable lens can be miniaturized.

It is to be noted that this lens barrel 12B has a short back focal length. Therefore, if the mount is constituted so that the lens barrel can be attached to the first camera body 11A, the photographing lens interferes with a constituting member (e.g., a quick return mirror for a TTL optical finder) of the camera body 11A, thereby causing a problem. To avoid the problem, in the present embodiment, as described above, the mount of the digital camera 1 is constituted to be different from that of the digital camera 2, and the lens barrel 12B cannot be directly attached to the first camera body 11A each other (see FIGS. 3A and 3B). The optical aberration of the lens barrel 12B is designed to be small in accordance with the thickness of the optical device of the second camera body 11B. As described later, even when the lens barrel 12A is attached to the second camera body 11B via the intermediate adapter 31, the optical aberration of the lens barrel can be minimized.

The above digital camera 30 is constituted of the second camera body 11B and the lens barrel 12A as the first lens attached to the second camera body 11B via the intermediate adapter 31 (FIG. 2).

The intermediate adapter 31 has: a front mount portion 33 which is a lens detachable portion disposed on one end of the adapter on a lens side; a rear mount portion 34 which is a lens detachable portion disposed on the other end of the adapter on a camera body side; and an intermediate cylinder 32 fixedly sandwiched between the front mount portion and the rear mount portion.

In the intermediate cylinder 32, a correction optical device 32a is disposed as a third optical device (optical device for compensating the optical path length). This correction optical device 32a is constituted of a glass plate which does not have any optical power.

Moreover, a state in which the correction optical device 32a is combined with the second optical device constituted of the optical LPF 8B built in the second camera body 11B and the like is optically equivalent (in other words, an optical equivalent amount is set to be equal) to a state of the first optical device constituted of the optical LPF 8A built in the first camera body 11A and the like. This respect will be described later.

The front mount portion 33 has the same shape as that of the mount portion 3A of the first camera body 11A, and can be engaged with and attached to the mount portion 4A of the lens barrel 12A.

The rear mount portion 34 has the same shape as that of the mount portion 4B of the lens barrel 12B, and can be engaged with and attached to the mount portion 3B of the second camera body 11B.

When the mount portion 34 of the intermediate adapter 31 is engaged with the mount portion 3B of the second camera body 11B, and the mount portion 33 of the intermediate adapter 31 is engaged with the mount portion 4A of the lens barrel 12A, the lens barrel 12A can be attached to the second camera body 11B via the intermediate adapter 31.

In the above attached state, a mount surface 33a of the front mount portion 33 closely abuts on the mount surface 4Aa of the lens barrel 12A. Furthermore, a mount surface 34a of the rear mount portion 34 closely abuts on the mount surface 3Ba of the second camera body 11B, and relative positions of the lens barrel 12A, the intermediate adapter 31 and the second camera body 11B are defined in the optical axis O direction.

In the present embodiment, a distance between the front mount surface 33a and the rear mount surface 34a of the intermediate adapter 31 is a distance which compensates for shortness of the flange focal length of the second camera body 11B with respect to the flange focal length of the first camera body 11A. Therefore, the optical flange focal length of the second camera body 11B having the intermediate adapter 31 attached thereto is equal to that of the first camera body 11A.

However, the first optical device adapted to the lens barrel 12A is different from the second optical device adapted to the lens barrel 12B of the second camera body 11B. Therefore, even when the lens barrel 12A is focused, the optical aberration of the lens barrel cannot be minimized. To solve the problem, as described above, the present embodiment is constituted by incorporating the correction optical device 32a in the intermediate cylinder 32 of the intermediate adapter 31 and combining the correction optical device 32a with the second optical device so that the second optical device optically becomes equivalent to the optical device disposed in the first camera body.

To be more specific, as described above, the total crystal plate thickness of the optical LPF 8A (the only crystal plates excluding the infrared ray absorbing glass) built in the first camera body 11A is 2.87 mm, and the total crystal plate thickness of the optical LPF 8B (the only crystal plates excluding the infrared ray absorbing glass) built in the second camera body 11B is 2.05 mm. The infrared ray absorbing glasses 8Ab and 8Bb, the dustproof filters 21A and 21B and the protective glasses 6A and 6B constituting the first and second optical devices except the crystal plates are made of the same material having an equal thickness.

Therefore, to set the total thickness of the first optical device to be equal to the total thickness obtained by adding the thickness of the correction optical device 32a to the total thickness of the second optical device, the thickness corresponding to shortness of the total crystal plate thickness of the optical LPF 8B with respect to that of the optical LPF 8A may be set to the thickness of the correction optical device 32a on the side of the intermediate adapter 31. The thickness corresponding to the deficiency is 0.82 mm. Even when the correction optical device 32a having a physical thickness of 0.82 mm is applied to the intermediate adapter 31, however, the optical aberration cannot be minimized.

To solve the problem, in the present embodiment, to set the optical equivalent amount of the second optical device and the correction optical device 32a to be equal to that of the first optical device, it is possible to minimize the optical aberration at a time when the intermediate adapter 31 is used.

In other words, by providing the correction optical device 32a within the intermediate adapter 31, an optical distance from the mount surface (lens attaching surface) 3Aa of the first camera body 11A to the image capture surface and an optical distance from the mount surface (lens attaching surface) 33a of the intermediate adapter 31 to the image capture surface of the second camera body 11B are set to be equal in a state in which the intermediate adapter 31 is attached to the second camera body 11B. In consequence, even with a combination of the lens barrel 12A and the second camera body 11B, the optical aberration can be minimized.

The optical equivalent-amount corresponds to an equivalent amount of a change of the effective optical path length in the optical axis direction including a deviation of an oblique ray in a magnification direction, and is given by $\Sigma\{$optical element thickness$\times$(1-optical element refractive index)/optical element refractive index$\}$. When this value is set to be equal in the optical device having the different constitution, the photoelectric conversion surface of the image sensor is focused, and the aberration can be minimized in both of the camera.

In the first camera body 11A (in a case where the reference pixel pitch δ0 of the image sensor=7 μm), a first optical equivalent amount of the first optical device constituted of optical elements is as follows:

$\Sigma\{ti\times(1-ni)/ni\}=1.00\times(1-1.52)/1.52 +0.84\times(1-1.544)/1.544+0.5(1-1.542)/1.542 +0.84\times(1-1.544)/1.544+1.19\times(1-1.544)/1.544 +0.6\times(1-1.52)/1.52=-1.734,$ wherein i is an integer of 1, 2, . . . given to each optical element constituting the first optical device from a lens side, ni is a refractive index of each optical element, and ti is a thickness thereof.

In the second camera body 11B (in a case where the pixel pitch δ1 of the image sensor=5 μm), a second optical equivalent amount of the second optical device constituted of optical elements is smaller than the first optical equivalent amount as follows:

$\Sigma\{tj\times(1-nj)/nj\}=1.00\times(1-1.52)/1.52 +0.6\times(1-1.554)/1.544+0.5(1-1.542)/1.542 +0.6\times(1-1.544)/1.544+0.85\times(1-1.544)/1.544 +0.6\times(1-1.52)/1.52 =-1.445,$ wherein j is an integer of 1, 2, . . . given to each optical element constituting the second optical device from the lens side, nj is a refractive index of each optical element, and tj is a thickness thereof.

Moreover, the correction optical device 32a built in the intermediate adapter 31 may be an optical device having a difference between the first optical equivalent amount and the second optical equivalent amount, that is, a third optical equivalent amount given by the following:

$\Sigma\{ti\times(1-ni)/ni\}-\Sigma\{tj\times(1-nj)/nj\}=(-1.734)-(-1.445)=-0.289.$ For example, in a case where the device is made of glass having a refractive index n=1.5, the third optical equivalent amount is th$\times$(1-1.5)/1.5, wherein th is a thickness of glass. Therefore, the thickness is as follows:

$th=-0.289\times1.5/(1-1.5)=0.867$ mm.

That is, when the optical glass plate having a thickness of th=0.867 mm is applied as the correction optical device 32a, a sum of the second optical equivalent amount and the third optical equivalent amount equals the first optical equivalent amount, and the above conditions can be satisfied.

In the present embodiment, the correction optical device 32a is used for correcting the optical equivalent amount, but may be provided with an effect of an infrared ray cutting filter or a visible light cutting filter, or may, needless to say, be provided with an effect of an optical low-pass filter to provide a secondary optical effect such as the optical low-pass filter effect different from an inherent effect. In a case where such a secondary effect is imparted to the correction optical device 32a, when the correction optical device is detachably attached to the intermediate adapter, a user can use the digital camera while freely changing the above secondary effect.

Moreover, the above correction optical device 32a itself does not have to be necessarily disposed in the intermediate adapter 31. For example, in a state in which the lens barrel 12A is attached to the second camera body 11B via the intermediate adapter 31, the correction optical device 32a may be inserted between a rear end portion of the lens barrel 12A and a front end portion of the second camera body 11B, or may be attached to the rear end portion of the lens barrel 12A or the front end portion of the second camera body 11B.

It is to be noted that in a case where the correction optical device of the third optical device is constituted of a plurality of optical elements, the third optical equivalent amount of the correction optical device is given by $\Sigma\{tk\times(1-nk)/nk\}$, wherein k is an integer of 1, 2, . . . given to each optical element constituting the correction optical device from the lens side, nk is the refractive index of each optical element and tk is the thickness thereof. Moreover, the first optical equivalent amount $\Sigma\{ti\times(1-ni)/ni\}$ of the first optical device may equal the sum of the second optical equivalent amount $\Sigma\{tj\times(1-nj)/nj\}$ of the second optical device and the third optical equivalent amount $\Sigma\{tk\times(1-nk)/nk\}$ of the correction optical device.

As described above, the distance between the front mount surface 33a and the rear mount surface 34a in the intermediate adapter 31 of the present embodiment is set so that the flange focal length on the side of the second camera body 11B having the intermediate adapter 31 attached thereto equals the flange focal length of the first camera body 11A. However, even in a case where there is a slight excess or deficiency in the distance, with respect to the first optical equivalent amount, the value of the sum of the second optical equivalent amount and the third optical equivalent amount is set to such a value as to compensate for the excess or the deficiency of the distance. Accordingly, in a state in which the lens barrel 12A is attached to the second camera body 11B via the intermediate adapter, a subject can be focused. Moreover, it is possible to take in a subject image having less optical aberration.

Figure 4A:
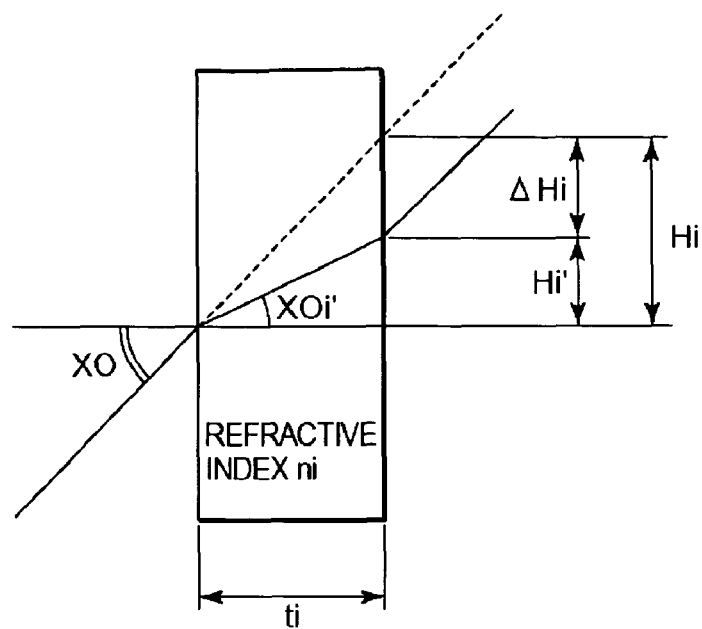
FIG. 4A is a diagram showing ray deviation amounts $\Delta Hi$, $\Delta Hj$ due to oblique incidence at a time when a ray strikes at an incidence angle $X0$ on an optical element constituting an optical device applied to the digital camera system of FIGS. 1A and 1B, and showing the ray deviation amount $\Delta Hi$ with respect to one optical element (on a first camera body side) having a thickness ti and a refractive index ni.
Figure 4B:
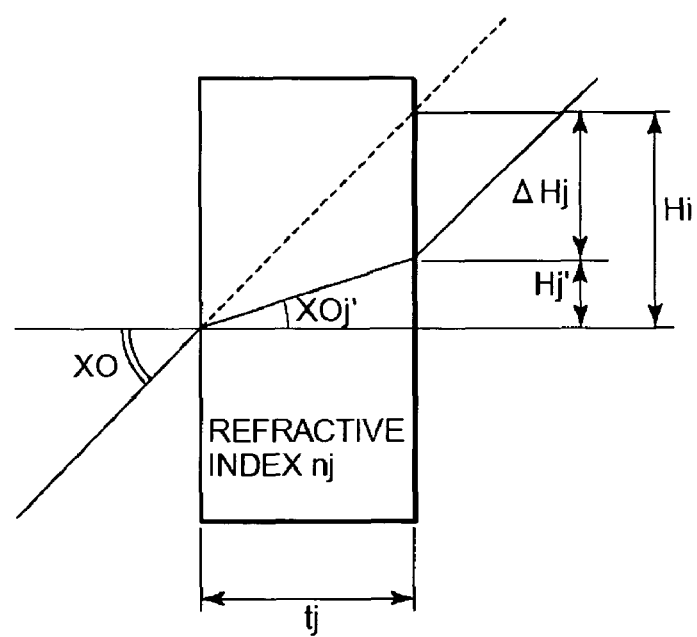
FIG. 4B is a diagram showing the ray deviation amounts $\Delta Hi$, $\Delta Hj$ due to the oblique incidence at a time when the ray strikes at the incidence angle $X0$ on the optical element constituting the optical device applied to the digital camera system of FIGS. 1A and 1B, and showing the ray deviation amount $\Delta Hj$ with respect to the other optical element (on a second camera body side) having a different thickness tj and a different refractive index nj.

FIGS. 4A, 4B are diagrams showing ray deviation amounts ΔHi, ΔHj due to oblique incidence at a time when the ray strikes at an incidence angle X0 on two types of optical elements having different thicknesses and refractive indexes. FIG. 4A shows the ray deviation amount ΔHi with respect to one optical element (on a first optical device side) having a thickness ti and a refractive index ni. FIG. 4B shows the ray deviation amount ΔHj with respect to the other optical element (on a second optical device side) having a different thickness tj and a different refractive index nj. It is to be noted that in the drawing, each of Hi and Hj denotes a height to a position where the incident ray is extended, each of Hi' and Hj' denotes a height to an emission point of a refracted ray, and the ray deviation amounts ΔHi, ΔHj are given by differences between Hi and Hj and between Hi' and Hj', respectively.

In a case where the aberration of the photographing lens in the magnification direction is considered, when the ray deviation amount ΔHi equals ΔHj, the aberration is equal. That is, a ray deviation amount ratio ΔHj/ΔHi may be 1. It is to be noted that the optical equivalent amount with respect to the optical device constituted of the above optical elements corresponds to a value obtained by adding the ray deviation amount ΔHi or ΔHj of each optical element.

Figure 5:
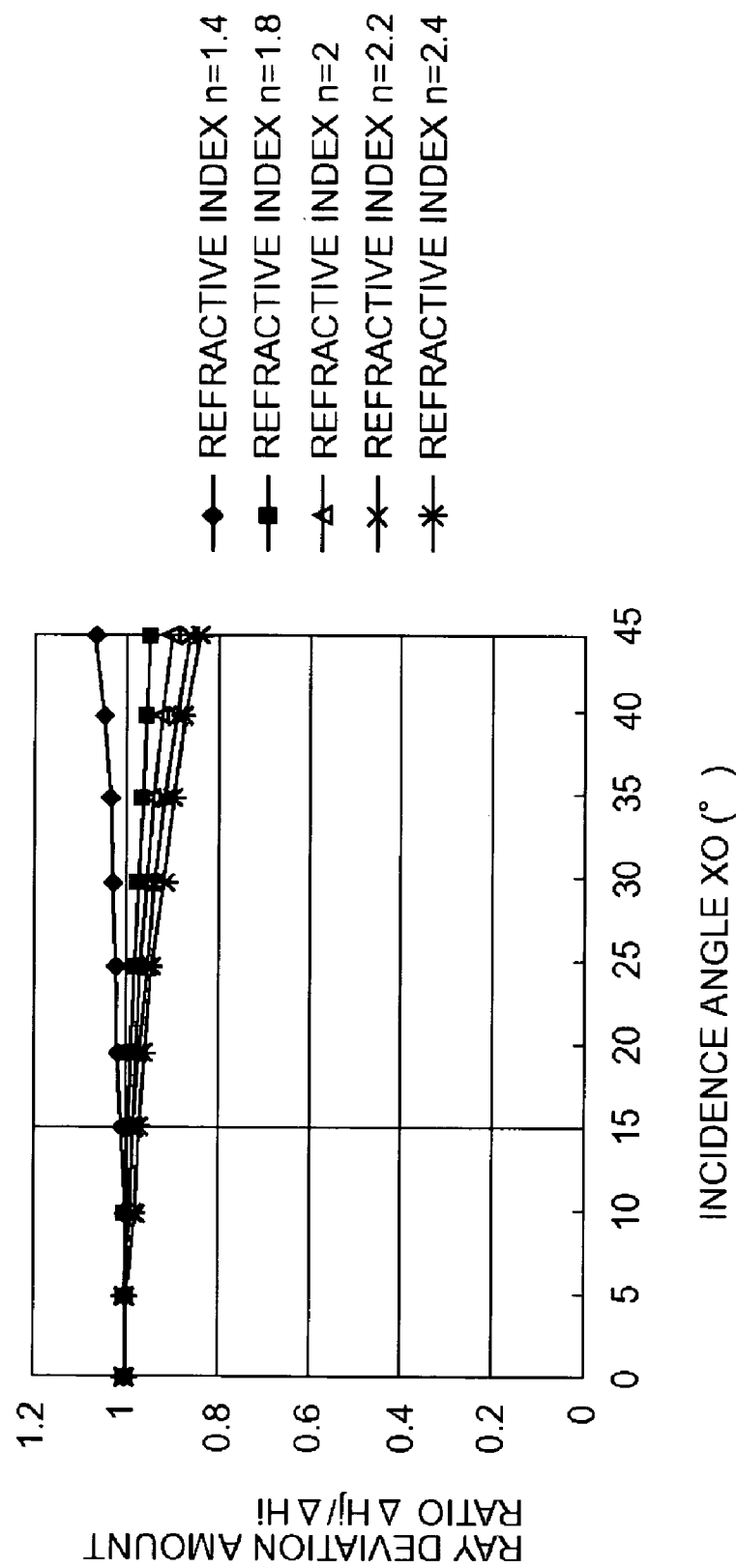
FIG. 5 is a graph showing a relation between the incidence angle $X0$ and a ray deviation amount ratio $\Delta Hj/\Delta Hi$ with respect to the incident ray on conditions that optical equivalent amounts of the optical elements having different refractive indexes are set to be equal.

FIG. 5 is a graph showing a relation between the incidence angle X0 and the ray deviation amount ratio ΔHj/ΔHi on conditions that optical equivalent amounts of the optical elements having different refractive indexes are set to be equal. In the drawing, as the ray deviation amount ΔHi, a value at a time when the optical element having a refractive index ni=1.5 is applied. The ray deviation amount ΔHj indicates a value of the optical element in which the refractive index nj changes to 1.4, 1.8, 2, 2.2 or 2.4.

As shown in FIG. 5, in a general optical material (the refractive index at a wavelength of 587.6 nm is 1.4 to 2), when the incidence angle is 15° or less, an optical deviation amount ratio is approximately 1 (error is 1% or less), and does not influence the optical aberration. The refractive index of 2.4 indicates a case where the LN device for use in the optical low-pass filter is used as the material. Even when a special material having a high refractive index, such as this LN device, is used, the optical deviation amount ratio can be close to 1. In this graph, the refractive index of light having a wavelength of 587.6 nm has been considered. Even as to another light having a wavelength of, for example, 486.1 nm to 626.3 nm, when the optical material is selected so that the ray deviation amount ratio is close to 1, it is possible to suppress an aberration change of even a chromatic aberration. In the digital camera, subject light having a wavelength in the vicinity of 420 nm to 650 nm is dominant in forming the image. Therefore, when the ray deviation amount ratio is set to approximately 1 in this wavelength range, an influence on the image of the chromatic aberration can be reduced.

Next, there will be described an inner structure of the digital camera 1 or 2 in the digital camera system of the present embodiment with reference to FIGS. 6 to 10.

Figure 6:
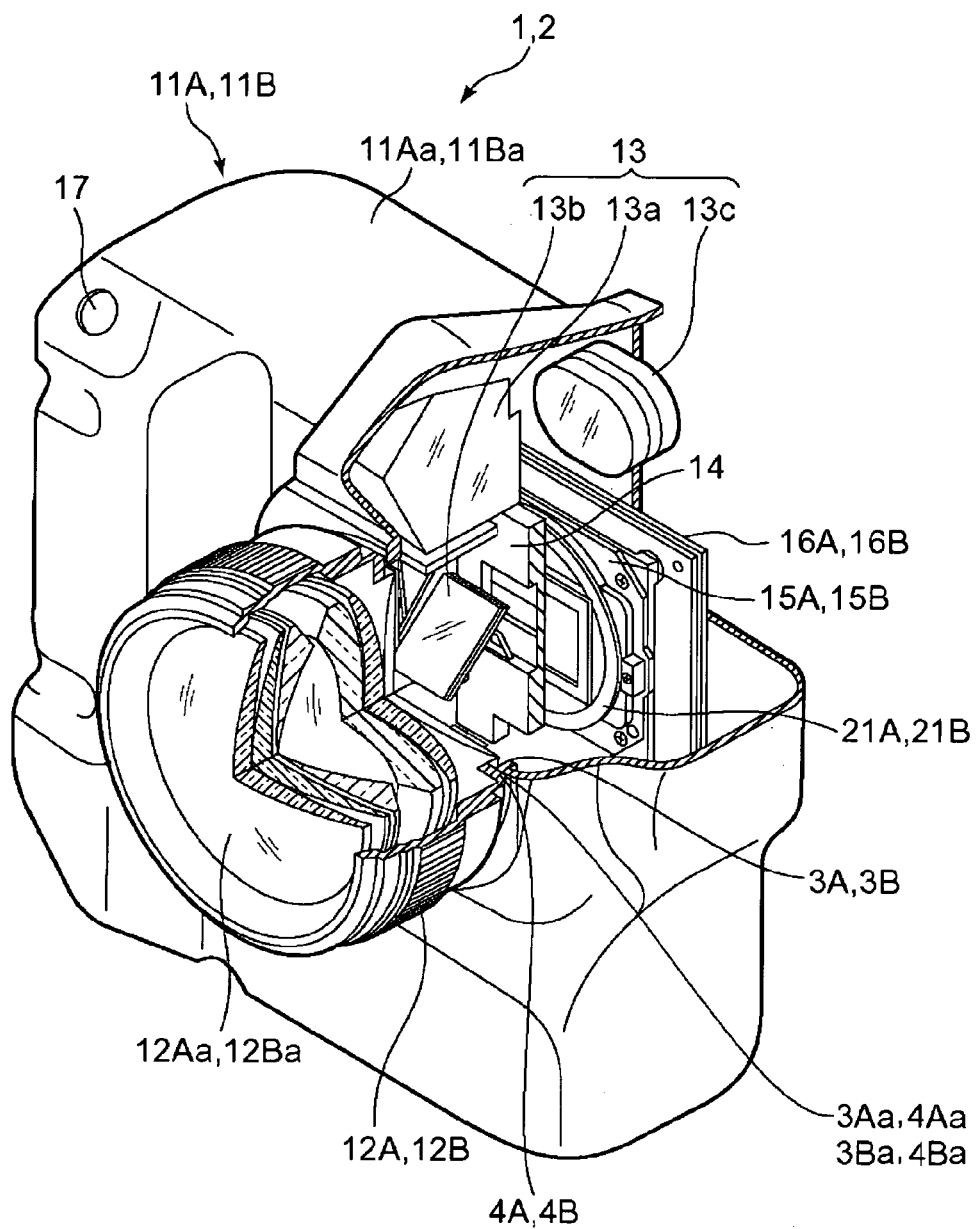
FIG. 6 is a perspective view (shown in a partially cut section) showing an inner structure in a state in which the lens barrel is attached to the camera body of the digital camera system of FIG. 1.
Figure 7:
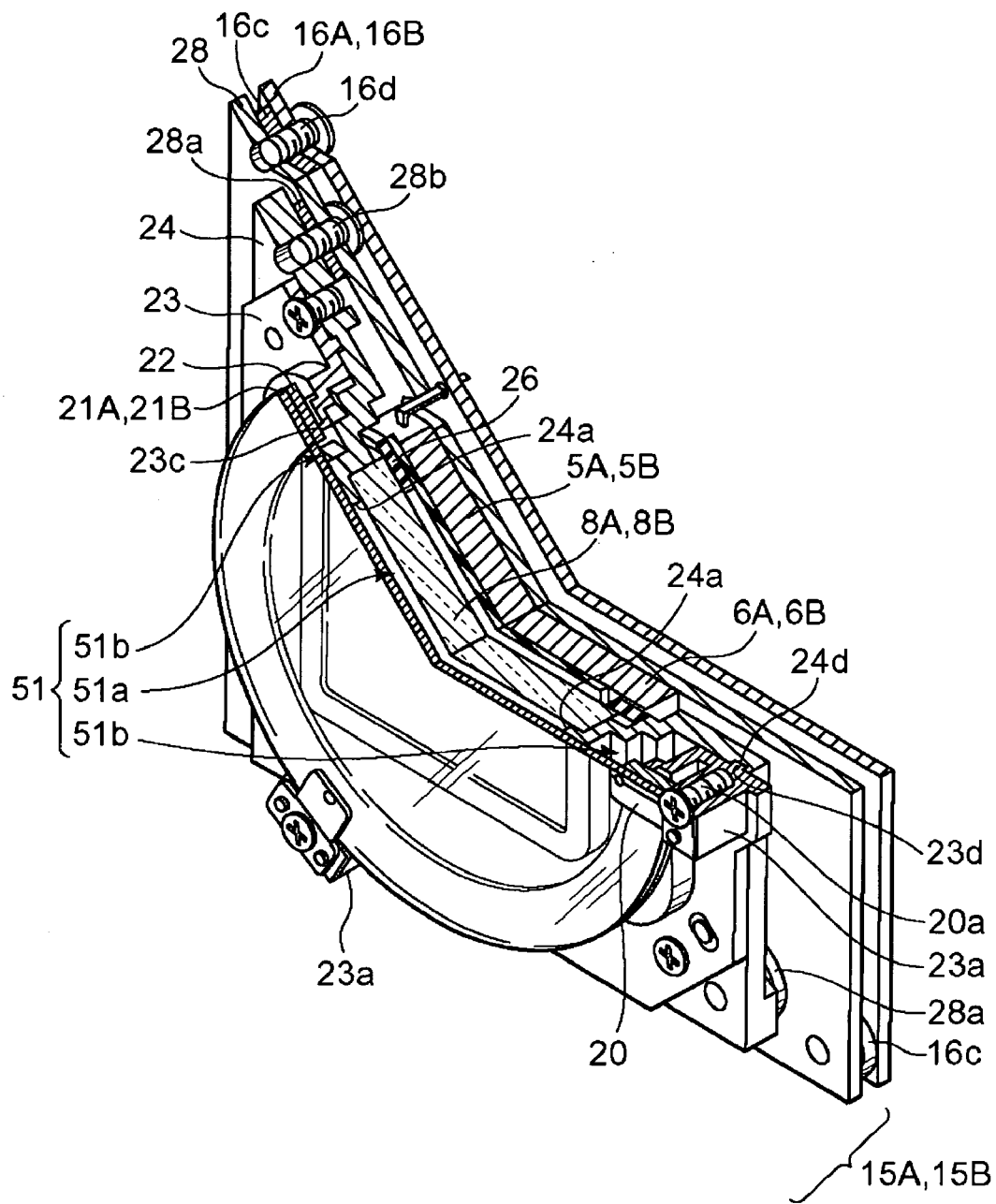
FIG. 7 is a perspective view (shown in a partially cut section) showing an inner structure around an image capture unit in the digital camera system of FIG. 1.

FIG. 6 is a perspective view (shown in a partially cut section) showing the inner structure in a state in which the interchangeable lens barrels 12A, 12B are attached to the camera bodies 11A, 11B in the digital cameras 1, 2, respectively. FIG. 7 is a perspective view (shown in a partially cut section) showing an inner structure around an image capture unit 15A, 15B in the digital camera 1, 2.

As shown in FIG. 6, the digital camera 1 includes: the lens barrel 12A; and the first camera body 11A which is a reference camera body detachably attached to the lens barrel 12A, or the digital camera 2 includes the lens barrel 12B; and the second camera body 11B which is a non-reference camera body detachably attached to the lens barrel 12B.

The first camera body 11A is different from the second camera body 11B in the image sensor of the contained image capture unit, the optical LPF, and the flange focal length, but the other constitution is the same.

The lens barrel 12A or 12B is constituted to hold therein the photographing optical system 12Aa or 12Ba constituted of a plurality of lenses, respectively. Moreover, this photographing optical system 12Aa or 12Ba is constituted of, for example, a plurality of optical lenses and the like so that a luminous flux from a subject is transmitted to form an image of the subject by the subject luminous flux in a predetermined position (on the photoelectric conversion surface of the image sensor 5A, 5B of FIG. 7) in a state in which there is not any optical aberration such as the field curvature aberration. That is, the photographing optical system is designed so as to eliminate the field curvature aberration generated by the optical LPF disposed on the front of the image sensor.

It is to be noted that here the state in which there is not any aberration includes a state in which there is the aberration to such an extent that there is not any practical problem during actual use. In other words, the photographing optical system 12Aa or 12Ba is designed so that various aberrations are optimum in consideration of the optical LPF disposed on the front of the image sensor and the like.

The camera body 11A or 11B includes various types of constituting members and the like in a main body portion 11Aa or 11Ba, and the body-side mount portion 3A or 3B is disposed in the front of the main body portion so that the lens barrel 12A or 12B holding the photographing optical system 12Aa, 12Ba is detachably attached. In this manner, the camera body 11A or 11B is a so-called "single lens reflex type" camera body. That is, substantially in the center of the front of the camera main body portion 11Aa, 11Ba, there is formed an aperture for exposure having a predetermined aperture size so as to guide the subject luminous flux into the camera main body portion 11Aa, 11Ba, and the body-side mount portion 3A or 3B is formed on a peripheral edge of this aperture for exposure.

There will be described in detail an inner constitution of the camera body 11A or 11B of the first or second digital camera.

First, in a predetermined position such as the top portion or the back of the camera main body portion 11Aa, 11Ba, there are disposed various types of operation members for operating the camera body 11A or 11B, for example, a release button 17 for generating an instructing signal or the like to start a photographing operation.

In each of the camera main body portions 11Aa and 11Ba, as shown in FIG. 6, various types of constituting members are arranged in predetermined positions, respectively: for example, a finder unit 13; a shutter portion 14; the image capture unit 15A (for the first camera body) or 15B (for second camera body); and a plurality of circuit substrates including a main circuit substrate 16A (for the first camera body) or 16B (for the second camera body).

The finder unit 13 is disposed in order to form a desired subject image taken by the photographing optical system 12Aa or 12Ba in a predetermined position different from a position on the photoelectric conversion surface of the image sensor 5A or 5B (FIG. 7), thereby forming a so-called observation optical system. The shutter portion 14 includes a shutter mechanism and the like which controls an irradiation time or the like with the subject luminous flux onto the photoelectric conversion surface of the image sensor 5A or 5B. The image capture unit 15A, 15B includes the image sensor, and obtains a subject image signal based on the subject luminous flux transmitted through the photographing optical system 12Aa, 12Ba. On the main circuit substrate 16A, 16B, various types of electric members are mounted which constitute an electric circuit such as an image signal processing circuit for subjecting the image signal acquired by the image sensor 5A or 5B to various types of signal processing. On the front of the image capture unit 15A, 15B, the dustproof filter 21A or 21B is disposed which prevents dust and the like from being attached to the photoelectric conversion surface of the image sensor.

The finder unit 13 is constituted of a reflective mirror 13b, a penta prism 13a, an eyepiece lens 13c and the like. The reflective mirror 13b bends the optical axis of the subject luminous flux transmitted through the photographing optical system 12Aa or 12Ba to guide the flux toward the observation optical system. The penta prism 13a receives the luminous flux emitted from this reflective mirror 13b to form a normal image. The eyepiece lens 13c enlarges the subject image via this penta prism 13a to observe the image.

The reflective mirror 13b is constituted movably between a position set back from the optical axis of the photographing optical system 12Aa or 12Ba and a predetermined position on the optical axis. The reflective mirror 13b in a usual state is disposed at a predetermined angle of, for example, 45° along the optical axis of the photographing optical system 12Aa or 12Ba. Accordingly, while the camera 1 or 2 is in the usual state, the optical axis of the subject luminous flux transmitted through the photographing optical system 12Aa or 12Ba is bent by the reflective mirror 13b, and the flux is reflected toward the penta prism 13a disposed above the reflective mirror 13b.

In an exposure operation during the photographing of the digital camera 1 or 2, the reflective mirror 13b moves to a predetermined position set back from the optical path of the photographing optical system 12Aa, 12Ba. Accordingly, the subject luminous flux is guided toward the image sensor to irradiate the photoelectric conversion surface of the image sensor.

The shutter portion 14 similar to a shutter portion for general utilization in a conventional camera or the like is applied, the portion including, for example, a focal plane type of shutter mechanism, a driving circuit for controlling an operation of this shutter mechanism and the like.

The image capture unit 15A for the first camera body is different from the image capture unit 15B for the second camera body in the contained image sensor and optical LPF only, and the other constitution is substantially the same. First, the image capture unit 15A for the first camera body will be described.

As shown in FIG. 7, the image capture unit 15A is constituted of: the image sensor 5A; an image sensor fixing plate 28; the optical LPF 8A; a low-pass filter receiving member 26; an image sensor storage case member 24 (hereinafter referred to as the CCD case 24); a dustproof filter receiving member 23; the dustproof filter 21A; a piezoelectric device 22; a pressing member 20 and the like.

The image sensor 5A is constituted of a CCD or the like which obtains an image signal corresponding to light transmitted through the photographing optical system 12Aa to irradiate the photoelectric conversion surface of the system. The image sensor fixing plate 28 is constituted of a thin-plate-like member which fixedly supports this image sensor 5A. The optical LPF 8A is disposed on the photoelectric conversion surface of the image sensor 5A, and formed so as to remove high-frequency components from the subject luminous flux transmitted through the photographing optical system 12Aa to irradiate the photoelectric conversion surface of the system. The low-pass filter receiving member 26 is disposed in a peripheral edge between this optical LPF 8A and the image sensor 5A, and is formed of an elastic member substantially having a frame shape or the like. The CCD case 24 stores and fixedly holds the image sensor 5A. Moreover, the optical LPF 8A is brought into close contact with a peripheral edge portion of the CCD case or the vicinity of the portion, and supported. A predetermined portion of the CCD case is brought into close contact with the dustproof filter receiving member 23 described later. As to the dustproof filter receiving member 23, the dustproof filter 21A disposed on the front of this CCD case 24 is brought into close contact with a peripheral edge portion of the dustproof filter receiving member or the vicinity of the portion, and supported. The dustproof filter 21A is a dustproof member supported by this dustproof filter receiving member 23 and disposed to face a predetermined position having a predetermined interval from the optical LPF 8A on the front of the optical LPF 8A on the photoelectric conversion surface of the image sensor 5A. The piezoelectric device 22 is disposed on the peripheral edge portion of this dustproof filter 21A, and applies a predetermined vibration to the dustproof filter 21A to remove the dust from the filter. The pressing member 20 is constituted of an elastic material which attaches the dustproof filter 21A to the dustproof filter receiving member 23 in an airtight manner to fixedly hold the filter.

The image sensor 5A receives the subject luminous flux transmitted through the photographing optical system 12Aa by the photoelectric conversion surface 5Aa (FIG. 1A) of the system to subject the flux to photoelectric conversion processing, thereby acquiring an image signal corresponding to the subject image formed on the photoelectric conversion surface. As the image sensor 5A, there is applied, for example, a 4/3 [four thirds®] type of charge coupled device having a reference pixel pitch $\delta 0$ of approximately 7 µm as a first pixel pitch.

This image sensor 5A is mounted on a predetermined position of the main circuit substrate 16A via the image sensor fixing plate 28. On this main circuit substrate 16A, both of an image signal processing circuit and a work memory (not shown) are mounted, and an output signal from the image sensor 5A, that is, an image signal obtained by the photoelectric conversion processing is transmitted to the image signal processing circuit or the like. The protective glass 6A (FIG. 7) is disposed in front of the photoelectric conversion surface of the image sensor 5A.

As signal processing in the image signal processing circuit, there are various types of signal processing such as processing to convert, into a signal adapted to a recording mode, the image output signal of the image sensor 5A corresponding to the image formed on the photoelectric conversion surface of the image sensor 5A by the photographing optical system 12Aa of the lens barrel 12A. Such signal processing is similar to processing usually performed in a general digital camera or the like constituted so as to handle an electronic image signal.

On the front of the image sensor 5A, the optical LPF 8A is disposed with the low-pass filter receiving member 26 being held between the sensor and the optical LPF. The optical LPF 8A is made of rock crystal of an optical element having a birefringent characteristic, and has a thickness ts0 corresponding to the pixel pitch $\delta 0$ (approximately 7 µm) of the image sensor 5A as described later. It is to be noted that as described later, the infrared ray absorbing glass is inserted into the optical LPF 8A.

Moreover, the CCD case 24 is disposed so as to cover the optical LPF 8A. Substantially in the center of this CCD case 24, a rectangular aperture is disposed, and in this aperture, the optical LPF 8A and the image sensor 5A are disposed from behind the aperture. On an inner peripheral edge portion behind this aperture, a stepped portion 24a having a substantially L-shaped section is formed which abuts on the front of the optical LPF 8A.

As described above, between the optical LPF 8A and the image sensor 5A, the low-pass filter receiving member 26 is disposed which is constituted of an elastic member or the like. This low-pass filter receiving member 26 is disposed in a position which avoids an effective region of the photoelectric conversion surface in the peripheral edge portion of the front of the image sensor 5A, and abuts on the vicinity of the peripheral edge portion of the back of the optical LPF 8A. Moreover, airtightness is substantially held between the optical LPF 8A and the image sensor 5A. Accordingly, an elastic force of the low-pass filter receiving member 26 acts on the optical LPF 8A in the optical axis direction.

Moreover, the peripheral edge portion of the front of the optical LPF 8A is brought into contact with the 24a of the CCD case 24 in a substantially airtight manner. Accordingly, the position of the optical LPF 8A in the optical axis direction is regulated against the elastic force of the low-pass filter receiving member 26 which is to displace the optical LPF 8A in the optical axis direction of the LPF.

In other words, when the optical LPF 8A is inserted into the aperture of the CCD case 24 from the backside, the position of the LPF in the optical axis direction is regulated by the stepped portion 24a. Accordingly, the optical LPF 8A is directed toward the front of the CCD case 24 so as to be prevented from being extracted outwardly.

After the optical LPF 8A is inserted into the aperture of the CCD case 24 from the backside in this manner, the image sensor 5A is disposed on the back of the optical LPF 8A. The low-pass filter receiving member 26 is held between the peripheral edge portions of the optical LPF 8A an dh image sensor 5A.

Moreover, the image sensor 5A is mounted on the main circuit substrate 16A with the image sensor fixing plate 28 being held therebetween as described above. Moreover, the image sensor fixing plate 28 is fixed to a screw hole 24e by a screw 28b from the backside of the CCD case 24 via a spacer 28a. Moreover, the main circuit substrate 16A is fixed to the image sensor fixing plate 28 by a screw 16d via a spacer 16c.

On the front of the CCD case 24, the dustproof filter receiving member 23 is fixed to a screw hole 24b of the CCD case 24 by a screw 23b. A peripheral groove 24d is formed into a substantially annular state in a predetermined position on the peripheral edge of the front of the CCD case 24. On the other hand, in a predetermined position of the peripheral edge of the backside of the dustproof filter receiving member 23, an annular convex portion 23d corresponding to the peripheral groove 24d of the CCD case 24 is substantially annularly formed over the whole periphery. Therefore, the annular convex portion 23d is fitted into the peripheral groove 24d to thereby fit the CCD case 24 into the dustproof filter receiving member 23 in an annular region, that is, a region where the peripheral groove 24d and the annular convex portion 23d are formed in the substantially airtight manner.

The dustproof filter 21A is made of glass, and entirely forms a circular or polygonal plate shape. At least a region of the filter having a predetermined breadth from the center of the filter in a radial direction forms a transparent portion, and this transparent portion is disposed to face the front of the optical LPF 8A at a predetermined interval.

Moreover, to the peripheral edge portion of one surface of the dustproof filter 21A, the piezoelectric device 22 is integrally disposed by bonding means such as an adhesive or the like. The piezoelectric device is a predetermined vibrating member for applying a vibration to the dustproof filter 21A, and is formed of an electromechanical conversion device or the like. This piezoelectric device 22 is constituted so that a predetermined driving voltage can be applied to the device from the outside to generate a predetermined vibration in the dustproof filter 21A.

Furthermore, the dustproof filter 21A is fixedly held by the pressing member 20 constituted of an elastic material such as a leaf spring so that the filter is bonded to the dustproof filter receiving member 23 in the airtight manner.

Substantially in the vicinity of the center of the dustproof filter receiving member 23, a circular or polygonal aperture is disposed. This aperture is set so as to have a sufficient size for transmitting the subject luminous flux transmitted through the photographing optical system 12Aa to irradiate the photoelectric conversion surface of the image sensor 5A disposed rearwards with the luminous flux.

In the peripheral edge portion of this aperture, a wall portion 23e protruding toward the front is substantially annularly formed, and in a distant end of this wall portion 23e, a receiving portion 23c is formed so as to further protrude toward the front.

On the other hand, in the vicinity of an outer peripheral edge portion of the front of the dustproof filter receiving member 23, a plurality of (three in the present embodiment) protruding portions 23a are formed in predetermined positions so as to protrude toward the front. The protruding portions 23a are formed to fixedly dispose the pressing member 20 which fixedly holds the dustproof filter 21A, and the pressing member 20 is fixed to distant end portions of the protruding portions 23a by fastening means such as a screw 20a.

The pressing member 20 is formed of an elastic material such as the leaf spring as described above, a proximal end portion of the member is fixed to the protruding portions 23a, and a free end portion of the member abuts on the outer peripheral edge portion of the dustproof filter 21A. Accordingly, the member presses the dustproof filter 21A toward the dustproof filter receiving member 23, that is, in the optical axis direction.

In this case, a predetermined portion of the piezoelectric device 22 disposed on the outer peripheral edge portion of the backside of the dustproof filter 21A abuts on the receiving portion 23c to thereby regulate the positions of the dustproof filter 21A and the piezoelectric device 22 in the optical axis direction. Therefore, the dustproof filter 21A is fixedly held by the piezoelectric device 22 so that the filter is bonded to the dustproof filter receiving member 23 in the airtight manner.

In other words, the dustproof filter receiving member 23 is bonded to the dustproof filter 21A via the piezoelectric device 22 by an urging force of the pressing member 20 in the airtight manner.

In addition, as described above, in the dustproof filter receiving member 23 and the CCD case 24, the annular convex portion 23d is fitted into the peripheral groove 24d in the substantially airtight manner. Moreover, the dustproof filter receiving member 23 is bonded to the dustproof filter 21A via the piezoelectric device 22 by the urging force of the pressing member 20 in the airtight manner. The optical LPF 8A is disposed in the CCD case 24 so that there is substantially the airtightness between the peripheral edge portion of the front of the optical LPF 8A and the stepped portion 24a of the CCD case 24. Furthermore, on the backside of the optical LPF 8A, the image sensor 5A is disposed via the low-pass filter receiving member 26, and the airtightness is substantially held between the optical LPF 8A and the image sensor 5A.

Therefore, in a space where the optical LPF 8A faces the dustproof filter 21A, a predetermined gap portion 51a is formed. In the peripheral edge of the optical LPF 8A, the CCD case 24, the dustproof filter receiving member 23 and the dustproof filter 21A form a space portion 51b. This space portion 51b is a sealed space formed so as to protrude outwardly from the optical LPF 8A.

Moreover, this space portion 51b is set as a space broader than the gap portion 51a. Moreover, the space formed by the gap portion 51a and the space portion 51b is a sealed space 51 sealed with the CCD case 24, the dustproof filter receiving member 23, the dustproof filter 21A and the optical LPF 8A in the substantially airtight manner as described above.

Figure 8:
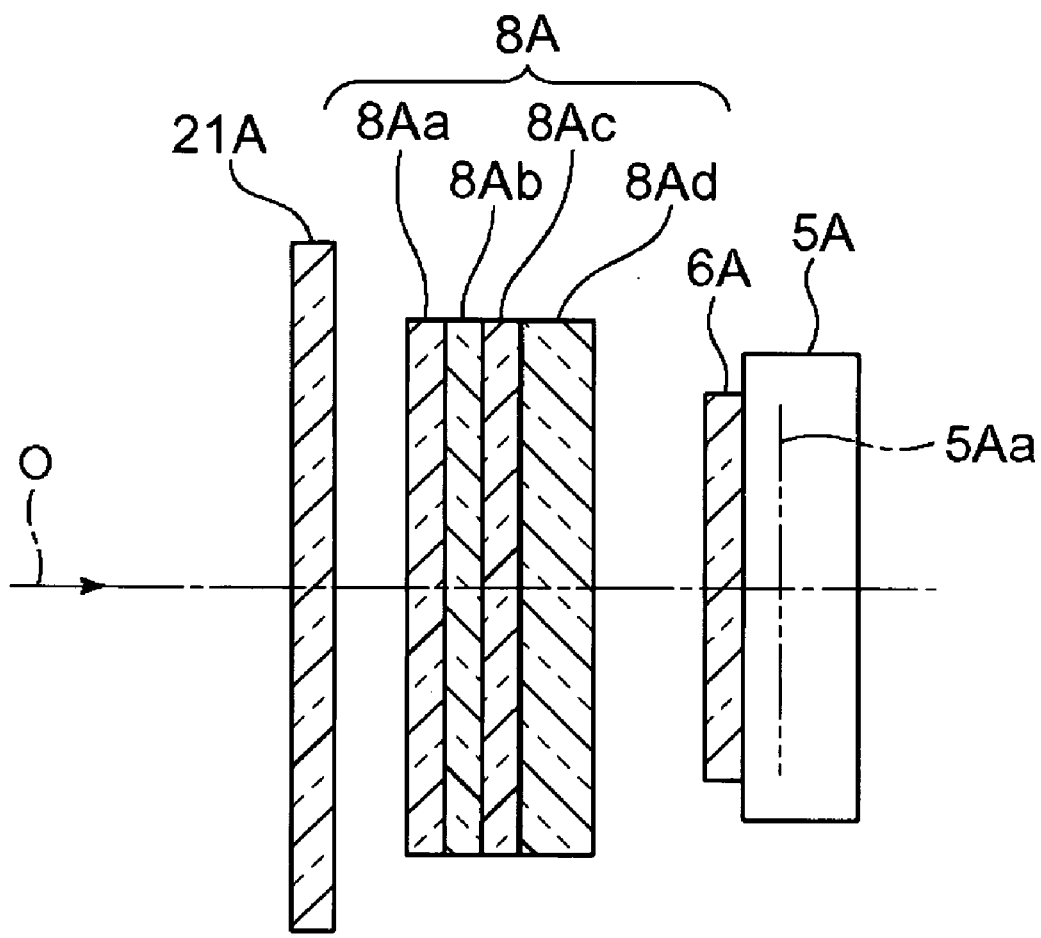
FIG. 8 is a schematic diagram showing details of an optical system of the image capture unit applied to the first camera body in the digital camera system of FIG. 1.
Figure 9:
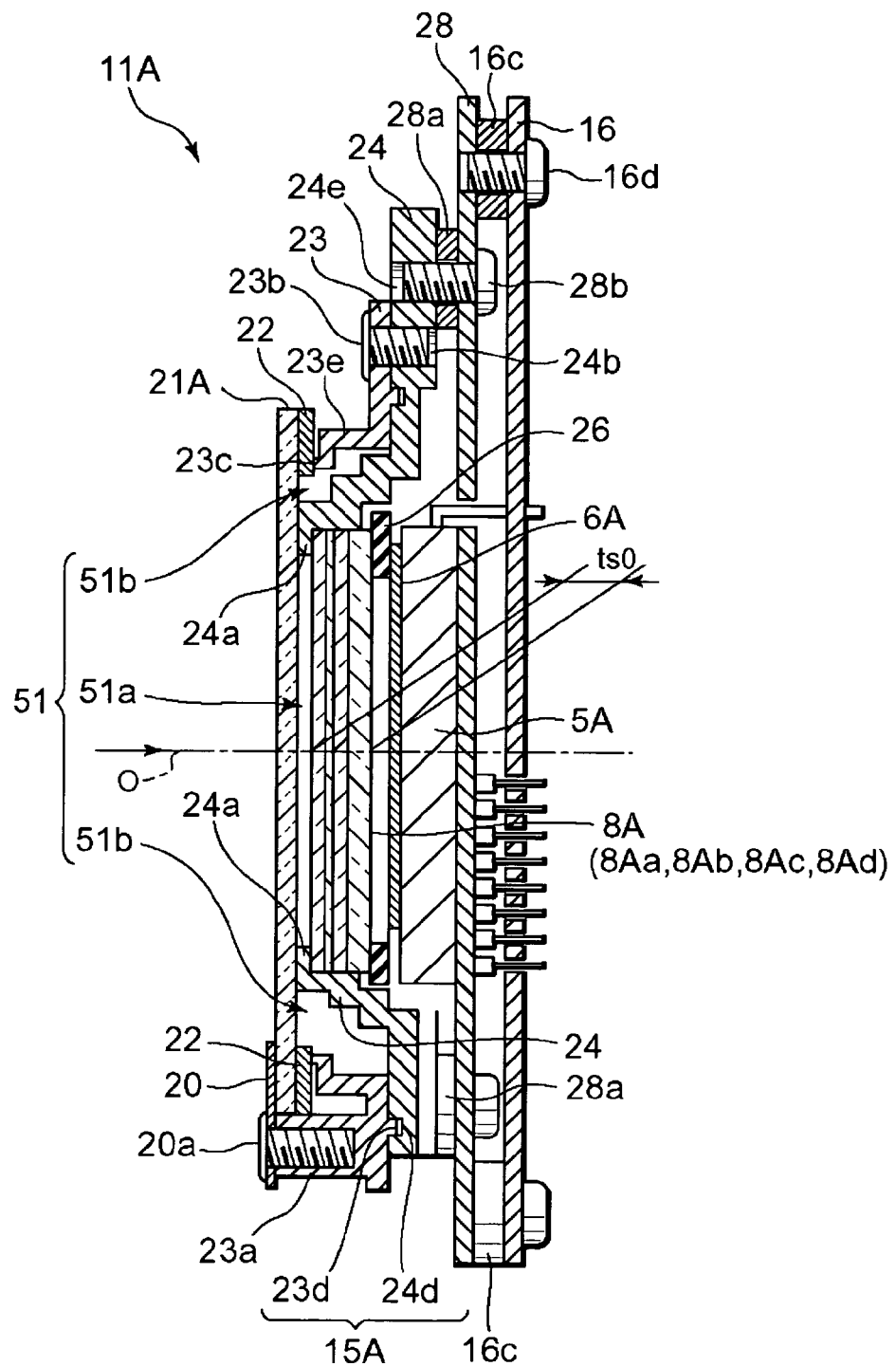
FIG. 9 is an enlarged vertically sectional view of the image capture unit applied to the first camera body in the digital camera system of FIG. 1.

FIG. 8 is a schematic diagram showing details of an optical system of the image capture unit 15A in the first camera body 11A, and FIG. 9 is an enlarged vertically sectional view of the image capture unit 15A.

As shown in FIG. 8, the protective glass 6A is disposed as the first optical device on the front of the image sensor 5A, and in front of the protective glass, the optical LPF 8A and the dustproof filter 21A are arranged.

As already described with reference to FIG. 1A, the optical LPF 8A is constituted by superimposing, from the front side, the crystal plate 8Aa having a birefringent direction (rotation angle) of −45°, the infrared ray absorbing glass 8Ab, the crystal plate 8Ac having a birefringent direction (rotation angle) of +45° and the crystal plate 8Ad having the birefringent direction (rotation angle) of 0°.

Each of the crystal plates 8Aa and 8Ac has a thickness corresponding to the pixel pitch δ0 (approximately 7 μ) of the image sensor 5A shown in FIG. 12. The crystal plate 8Ad has a thickness of square root times to that of the crystal plate 8Aa, 8Ab. Therefore, when the subject luminous flux struck via the lens barrel 12A forms the image on the photoelectric conversion surface 5Aa of the image sensor 5A, the Moire fringes are prevented from being generated.

Moreover, each of the crystal plates 8Aa, 8Ac and 8Ad and the infrared ray absorbing glass 8Ab has a refractive index close to that of glass, and a total thickness of the crystal plates and the infrared ray absorbing glass 8Ab is ts0. Moreover, the photoelectric conversion surface 5Aa of the image sensor 5A is positioned in the image forming position of the subject luminous flux based on the effective optical path length corresponding to the refractive index and the thickness ts0 of each of the crystal plates 8Aa, 8Ac and 8Ad and the infrared ray. absorbing glass 8Ab. Therefore, the subject luminous flux taken in by the lens barrel 12A is correctly formed into the image on the photoelectric conversion surface 5Aa of the image sensor 5A in the state in which there is not any field curvature aberration. Strictly, the thicknesses of the protective glass 6A and the dustproof filter 21A also contribute to the change of the effective optical path length.

It is to be noted that the thicknesses of the protective glass 6A for the first camera body 11A and the dustproof filter 21A are equal to those of the protective glass 6B for the second camera body 11B and the dustproof filter 21B (FIG. 1B), respectively. Therefore, there is not any difference in effective optical path length between the protective glasses 6A and 6B and between the dustproof filters 21A and 21B in the first camera body 11A and the second camera body 11B.

Moreover, in a case where the thickness and/or the material of the protective glass 6A or the dustproof filter 21A is changed for the first camera body 11A and the second camera body 11B, the thickness or the material of the compensating optical device needs to be changed so as to compensate for the change of the effective optical path length accompanying the change, thereby correcting optical aberrations such as the field curvature aberration, the spherical aberration and the astigmatism.

Figure 10:
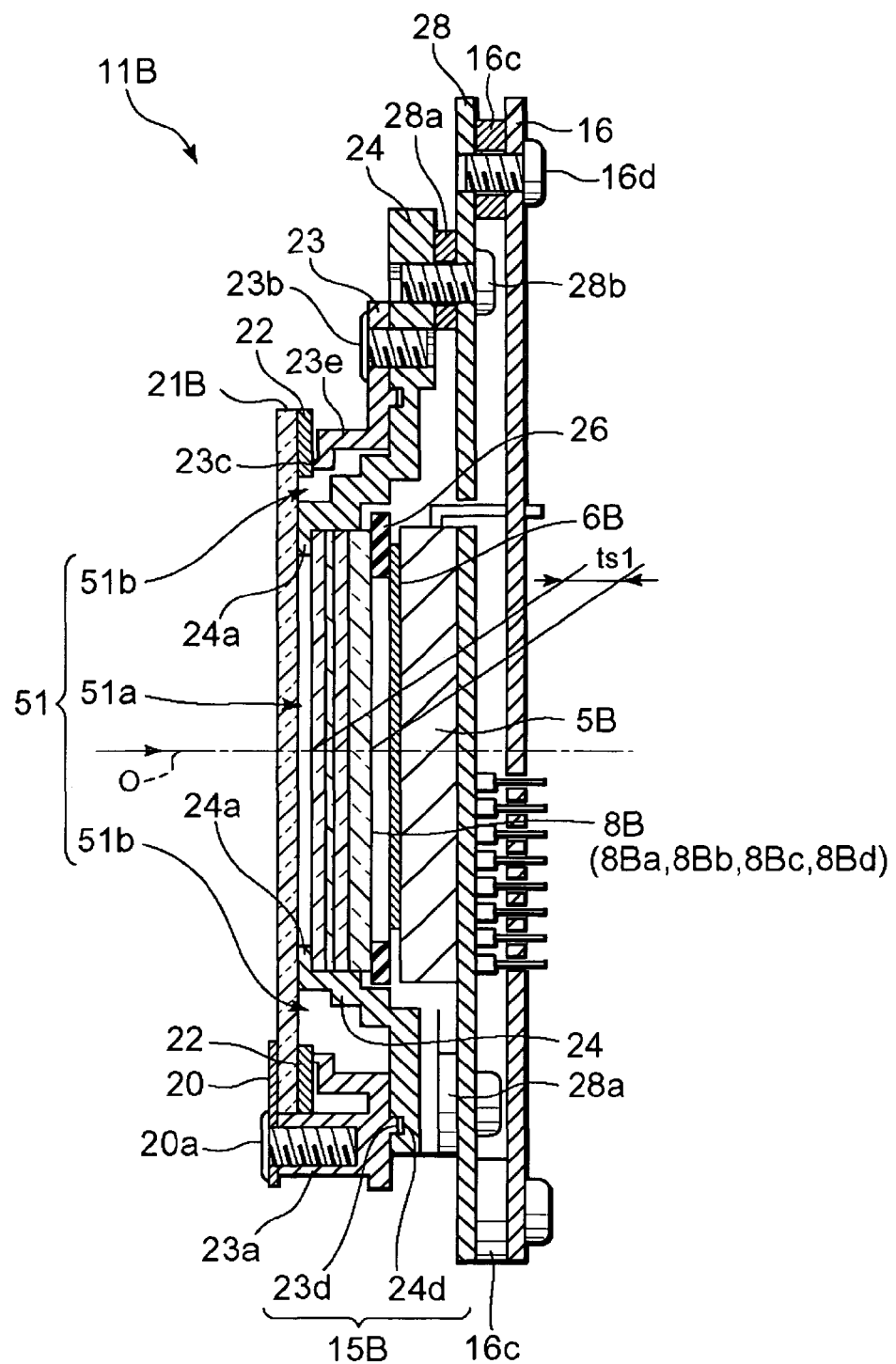
FIG. 10 is an enlarged vertically sectional view of the image capture unit applied to the second camera body in the digital camera system of FIG. 1.

On the other hand, instead of the image sensor 5A and the optical LPF 8A of the image capture unit 15A of the first camera body 11A, the second camera body 11B contains the image sensor 5B and the optical LPF 8B of the image capture unit 15B. The other constitution of the second camera body 11B is the same as that of the first camera body 11A, and a different respect will be described hereinafter. FIG. 10 is an enlarged vertically sectional view of the image capture unit 15B in the second camera body 11B.

The size of the image sensor 5B of the image capture unit 15B contained in the second camera body 11B is of the ⅘ [four thirds®] type in the same manner as in the image sensor 5A, but the image sensor 5B has, for example, a pixel pitch δ1 as the second pixel pitch which is different from the reference pixel pitch δ0 (approximately 7 μ).

As already described with reference to FIG. 1B, the optical LPF 8B disposed in front of the image sensor 5B is an optical device member constituted by superimposing the crystal plate 8Ba, the infrared ray absorbing glass 8Bb, the crystal plate 8Bc and the crystal plate 8Bd to secure them with an optical adhesive. The crystal plates 8Ba, 8Bc and 8Bd have such thicknesses to double refract the subject luminous flux in accordance with the pixel pitch of the image sensor 5B, and the thickness of this optical LPF 8B is ts1. The infrared ray absorbing glass 8Bb is formed of the same material as that of the infrared ray absorbing glass 8Ab applied to the first camera body 11A, and has an equal thickness and refractive index.

It is to be noted that the crystal plate may be replaced with the LN device as described later in accordance with the pixel pitch of the image sensor.

In a case where the pixel pitch δ1 of the image sensor 5B of the second camera body 11B is smaller than the reference pixel pitch δ0=7 μm, and is 5 μm, that is, the number of the pixels of the image sensor 5B is larger than that of the image sensor 5A, the thickness ts1 of the optical LPF 8B of the second camera body 11B is smaller than the thickness ts0 of the optical LPF 8A (FIG. 12).

Moreover, the dustproof filter 21B and the protective glass 6B are disposed on front portions of the optical LPF 8B and the image sensor 5B, respectively, but as described above, they have thicknesses and refractive indexes which are equal to those of the dustproof filter 21A and the protective glass 6A in the first camera body 11A, respectively, as described above.

According to the above image capture unit 15B, the subject luminous flux taken via the attached lens barrel 12B is correctly formed into the image on the photoelectric conversion surface 5Ba of the image sensor 5B without any image forming positional deviation in a state in which there is not any field curvature aberration, spherical aberration, astigmatism or the like.

In the present embodiment, the reference pixel pitch δ0 of the image sensor on the side of the reference first camera body 11A is set to 7 μ. A method of setting this reference pixel pitch will be described hereinafter.

As described above, the thickness of the optical LPF (optical low-pass filter) is determined in accordance with the pixel pitch of the image sensor. Even when the pixel pitch is equal, however, the thickness of the filter changes in accordance with the material of the optical LPF. As shown in FIG. 12, in a case where, for example, rock crystal is used as a first material, and a case where the LN device is used as a second material, the thickness completely differs. It is to be noted that the number of the pixels shown in FIG. 12 indicates an example of the ¾[four thirds®] type image sensor.

On the other hand, to miniaturize the camera, it is preferable to use a thinner optical LPF, but an excessively thin filter is not preferable because it is difficult to manufacture the optical LPF itself, and the filter might be broken. The example of the LN device will be described. In the present situation, as shown in FIG. 12, the thickness of each LN device constituting the optical LPF in accordance with the image sensor having a pixel pitch which is smaller than about 7 to 6 μm is about 0.1 mm or less, and it becomes difficult to manufacture the optical LPF.

To solve the problem, the pixel pitch which is not less than a pixel pitch capable of coping with the minimum thickness formed by the LN device as the second material is set as the reference pixel pitch. Moreover, when the optical LPF is made of rock crystal as the first material in accordance with this reference pixel pitch, the minimum thickness of the optical LPF can be set with respect to the camera body having any pixel pitch.

That is, with respect to the camera body having the image sensor with the pixel pitch which is smaller than the reference pixel pitch, as seen from FIG. 12, the optical LPF which is thinner than that made of rock crystal in accordance with the reference pixel pitch can be formed of rock crystal which is the same material as that of the optical LPF in accordance with the reference pixel pitch. Since the thickness of the optical LPF can be set to be smaller than that of the optical LPF corresponding to the reference pixel pitch in this manner, the effective optical path length can be compensated by the compensating optical device.

Moreover, the number of the pixels of the image sensor of the digital camera is set to, for example, three million pixels, four million pixels and five million pixels in a stepwise manner in many cases. Therefore, the reference pixel pitch may be slightly smaller than the pixel pitch which can be coped with by the optical LPF formable of the second material and having the minimum thickness. That is, the optical LPF corresponding to the pixel pitch of the image sensor having a smaller pixel number (larger pixel pitch) as compared with the reference camera body may be formed of the second material. When the reference pixel pitch is set in this manner, the thickness of the optical LPF can further be reduced.

Furthermore, reference pixel pitch data set as described above are references for design of the lens barrel (interchangeable lens) and design of the finder unit 13 for use in attaching this lens barrel to the camera body 11B having a short flange focal length.

As described above, according to the digital camera system of the present embodiment, in the digital camera system constituted of the first camera body 11A having a long flange focal length and the first lens barrel 12A attachable to the camera body, the second camera body 11B having a short flange focal length and the lens barrel 12B attachable to the camera body, and the intermediate adapter 31, the second camera body 11B can further be miniaturized and lightened. Furthermore, the lens barrel 12A can be attached to the second camera body 11B via the intermediate adapter 31, and high-quality image capture can be performed even in the attached state.

This invention is not limited to the above embodiments, and additionally in an implementing stage, various modifications can be carried out without departing from the scope. Furthermore, the above embodiments include various stages of inventions, and various inventions can be extracted by an appropriate combination of a plurality of disclosed constituting requirements.

According to the digital camera system of the present invention, in the digital camera system constituted of the first and second camera bodies having different flange focal lengths and the first and second lenses attachable to the camera bodies, and the intermediate adapter, the second camera body having a short flange focal length can be miniaturized and lightened. Furthermore, the system can be utilized as a digital camera system in which the first lens can be attached to the second camera body via the intermediate adapter, and high-quality image capture can be performed even in the attached state.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A digital camera system comprising:
   a first camera body including a first image sensor and having a first flange focal length;
   a first optical device constituted of a plurality of optical elements arranged in a photographing optical path of the first image sensor;
   a first lens adapted to the first camera body, which is designed to have the minimum generation of the optical aberration in combination with the first optical device;
   a second camera body including a second image sensor and having a second flange focal length which is shorter than the first flange focal length;
   a second optical device constituted of a plurality of optical elements arranged in a photographing optical path of the second image sensor;
   a second lens adapted to the second camera body, which is designed to have the minimum generation of the optical aberration in combination with the second optical device; and
   an intermediate adapter having a lens detachable portion for detachably attaching the first lens on one end of the intermediate adapter and having a lens detachable portion for detachably attaching the second camera body on the other end thereof,
   wherein the intermediate adapter includes a third optical device which does not have any optical power to minimize the optical aberration in the combination of the first lens with the second optical device;
   a first optical equivalent amount $\Sigma\{ti\times(1-ni)/ni\}$ of the first optical element is larger than a second optical equivalent amount $\Sigma\{tj\times(1-nj)/nj\}$ of the second optical equivalent amount, in which i and j each is an integer of 1, 2, ... given to each optical element of the first and second optical devices from a lens side, ni is a refractive index of each optical element of the first optical device, ti is a thickness thereof, nj is a refractive index of each optical element of the second optical device, and tj is a thickness thereof; and
   a sum $\Sigma\{tk\times(1-nk)/nk\}+\Sigma\{tj\times(1-nj)/nj\}$ of a third optical equivalent amount $\Sigma\{tk\times(1-nk)/nk\}$ and the second optical equivalent amount $\Sigma\{tj\times(1-nj)/nj\}$ is substantially equal to the first optical equivalent amount $\Sigma\{ti\times(1-ni)/ni\}$, in which k is an integer of 1, 2, ... given to each optical element of the third optical device from a lens side, nk is a refractive index of each optical element of the third optical device, and tk is a thickness thereof.

2. The digital camera system according to claim 1, wherein the first, second and third optical devices includes at least one of a dustproof glass, a plate constituting an optical low-pass filter and made of optical crystals, infrared ray absorbing glass and protective glass for protecting the image sensor.

3. The digital camera system according to claim 1, wherein a pixel pitch of the first image sensor is larger than that of the second image sensor.

4. The digital camera system according to claim 1, wherein the first optical device includes a first optical low-pass filter, and a thickness or the first optical low-pass filter is larger than that of a second optical low-pass filter included in the second optical device.

5. The digital camera system according to claim 1, wherein a maximum angle formed by a chief ray struck at a diagonal angle of the first image sensor with an optical axis of the first lens is smaller then that formed by a chief ray struck at a diagonal angle of the second image sensor with an optical axis of the second lens.

6. The digital camera system according to claim 1, wherein the second lens is constituted so as to be prevented from being attached to the first camera body.

7. An intermediate adapter which adapts a photographing lens adapted to a first camera body having a first optical device disposed in a photographing optical path to a second camera body having a flange focal length which is shorter than that of the first camera body and having a second optical device disposed in the photographing optical path, the second optical device being configured to have an optical characteristic which is different from that of the first optical device, wherein an optical path length compensating optical device is disposed, of which refractive index and thickness are set in order to compensate an optical aberration caused by a difference in an optical path length between the luminous flux reaching the center of a photographing screen of the second camera body and the luminous flux reaching the peripheral portion of a photographing screen of the second camera body.

8. A digital camera system comprising:
a first camera body including a first image sensor and having a first flange focal length;
a first optical device constituted of a plurality of optical elements arranged in a photographing optical path of the first image sensor;
a photographing optical path of the first image sensor;
a first lens adapted to the first camera body, which is designed to be optimum in combination with the first optical device;
a second camera body including a second image sensor and having a second flange focal length which is shorter than the first flange focal length;
a second optical device constituted of a plurality of optical elements arranged in a photographing optical path of the second image sensor;
a second lens adapted to the second camera body, which is designed to be optimum in combination with the second optical device; and
an intermediate adapter having a lens detachable portion for detachably attaching the first lens on one end of the intermediate adapter and having a lens detachable portion for detachably attaching the second camera body on the other end thereof, wherein
the intermediate adapter includes a third optical device which does not have any optical power to reduce an optical aberration generated by the combination of the first lens with the second optical device.

9. The digital camera system according to claim 8, wherein the third optical device is disposed, of which refractive index and thickness are set in order to compensate an optical aberration caused by a difference in an optical path length between the luminous flux reaching the center of a photographing screen of the second camera body and the luminous flux reaching the peripheral portion of a photographing screen of the second camera body.

* * * * *